(12) United States Patent
Xu et al.

(10) Patent No.: US 12,137,467 B2
(45) Date of Patent: Nov. 5, 2024

(54) MBMS TRANSMISSION RELIABILITY ENHANCEMENT

(71) Applicant: Apple Inc., Cupertino, CA (US)

(72) Inventors: Fangli Xu, Beijing (CN); Chunhai Yao, Beijing (CN); Dawei Zhang, Saratoga, CA (US); Haijing Hu, Beijing (CN); Murtaza A. Shikari, Mountain View, CA (US); Naveen Kumar R. Palle Venkata, San Diego, CA (US); Ralf Rossbach, Munich (DE); Sarma V. Vangala, Campbell, CA (US); Sethuraman Gurumoorthy, San Jose, CA (US); Srinivasan Nimmala, San Jose, CA (US); Srirang A. Lovlekar, Cupertino, CA (US); Sudeep Manithara Vamanan, Nuremberg (DE); Wei Zeng, San Diego, CA (US); Yuqin Chen, Shenzhen (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 352 days.

(21) Appl. No.: 17/438,498

(22) PCT Filed: Oct. 22, 2020

(86) PCT No.: PCT/CN2020/122802
§ 371 (c)(1),
(2) Date: Sep. 13, 2021

(87) PCT Pub. No.: WO2022/082592
PCT Pub. Date: Apr. 28, 2022

(65) Prior Publication Data
US 2022/0322289 A1 Oct. 6, 2022

(51) Int. Cl.
*H04W 72/30* (2023.01)

(52) U.S. Cl.
CPC .................. *H04W 72/30* (2023.01)

(58) Field of Classification Search
CPC ..... H04W 72/30; H04W 28/04; H04W 28/06; H04W 4/06; H04W 76/18; H04W 76/40;
(Continued)

(56) References Cited

U.S. PATENT DOCUMENTS

2005/0113099 A1 5/2005 Eriksson et al.
2008/0310338 A1* 12/2008 Charpenter ........... H04L 1/1671
370/315
(Continued)

FOREIGN PATENT DOCUMENTS

CN 114079874 A * 2/2022
EP 3484193 A4 5/2019
(Continued)

OTHER PUBLICATIONS

International Search Report for PCT Patent Application No. PCT/CN/2020/122802; mailed Apr. 9, 2021.
(Continued)

*Primary Examiner* — Farid Seyedvosoghi
(74) *Attorney, Agent, or Firm* — Kowert, Hood, Munyon, Rankin & Goetzel, P.C.

(57) ABSTRACT

Apparatuses, systems, and methods for enhancement of MBMS transmission reliability. A UE may receive PDCP PDUs via a PTM link from a network. The UE may determine to provide feedback regarding receipt of the PDCP PDUs, e.g., based, at least in part, on an occurrence of a triggering event. The triggering event may be configured by the network and may include the UE receiving a request for feedback from the network, the UE determining that at least one PDCP PDU is missing, the UE determining
(Continued)

that a number of missing PDCP PDUs exceeds a threshold, and/or the UE determining that a PDCP reordering window is changing based on expiration of a PDCP reordering timer. The UE may transmit feedback associated with receipt of the PDCP PDUs. The feedback may include an indication of missing PDCP PDUs, e.g., such as an indication of a sequence number associated with missing PDCP PDUs.

20 Claims, 16 Drawing Sheets

(58) Field of Classification Search
CPC ........... H04W 80/02; H04L 2001/0093; H04L 1/1854; H04L 1/1883; H04L 1/1896; H04L 1/1685; H04L 1/18; H04L 1/1887; H04L 69/324
See application file for complete search history.

(56) References Cited

U.S. PATENT DOCUMENTS

| | | | | |
|---|---|---|---|---|
| 2009/0303996 | A1* | 12/2009 | Takase | H04L 45/28 370/390 |
| 2013/0322273 | A1* | 12/2013 | Etemad | H04N 21/24 370/252 |
| 2015/0304378 | A1* | 10/2015 | Bi | H04L 65/611 370/329 |
| 2023/0110505 | A1* | 4/2023 | Wang | H04L 1/08 370/331 |
| 2023/0171566 | A1* | 6/2023 | Wang | H04W 4/06 370/312 |

FOREIGN PATENT DOCUMENTS

| | | |
|---|---|---|
| JP | 2018085743 | 5/2018 |
| KR | 10-2007-0010037 | 1/2007 |
| KR | 10-2014-0037285 | 3/2014 |
| WO | WO-2017035727 A1 * | 3/2017 |
| WO | 2018030305 A1 | 2/2018 |

OTHER PUBLICATIONS

Partial European Search Report for European Patent Application No. 20930654; 11 pages; Apr. 12, 2022.
Office Action JP Patent Application No. 2023-524811; Feb. 9, 2024.
Qualcomm Inc "NR Multicast dynamic PTM PTP switch with service continuity"; 3GPP TSG RAN WG2 #111-e R2-2006794; Aug. 17, 2020.
Huawei et al. "Retention of P-field in DRB PDCP data PDU"; 3GPP TSG RAN WG2 adhoc_2017_06_NR R2-1706482; Jun. 27, 2017.
Sequans Communications "Reordering timer for PDCP operation with (DL) duplication"; 3GPP TSG RAN WG2 #101bis R2-1805954; Apr. 16, 2018.
Office Action for KR Patent Application No. 10-2021-7034162; Mar. 14, 2024.
LG Electronics "Discussion on user-plane structure for NR multicast"; 3GGP TSG-RAN2 #111e R2-2008031; Aug. 17, 2020.

* cited by examiner

MBMS TRANSMISSION RELIABILITY ENHANCEMENT

PRIORITY CLAIM INFORMATION

This application is a national stage application of International Application No. PCT/CN2020/122802, filed on Oct. 22, 2020, titled "MBMS Transmission Reliability Enhancement", which is hereby incorporated by reference in its entirety.

FIELD

The invention relates to wireless communications, and more particularly to apparatuses, systems, and methods for enhancement of MBMS transmission reliability, e.g., in 5G NR systems and beyond.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) is currently the technology of choice for the majority of wireless network operators worldwide, providing mobile broadband data and high-speed Internet access to their subscriber base. LTE was first proposed in 2004 and was first standardized in 2008. Since then, as usage of wireless communication systems has expanded exponentially, demand has risen for wireless network operators to support a higher capacity for a higher density of mobile broadband users. Thus, in 2015 study of a new radio access technology began and, in 2017, a first release of Fifth Generation New Radio (5G NR) was standardized.

5G-NR, also simply referred to as NR, provides, as compared to LTE, a higher capacity for a higher density of mobile broadband users, while also supporting device-to-device, ultra-reliable, and massive machine type communications with lower latency and/or lower battery consumption. Further, NR may allow for more flexible UE scheduling as compared to current LTE. Consequently, efforts are being made in ongoing developments of 5G-NR to take advantage of higher throughputs possible at higher frequencies.

SUMMARY

Embodiments relate to wireless communications, and more particularly to apparatuses, systems, and methods for enhancement of MBMS transmission reliability, e.g., in 5G NR systems and beyond.

For example, in some embodiments, a user equipment device (LTE), such as UE 106, may be configured to receive PDCP PDUs (e.g., one or more PDCP PDUs) via a PTM link from a network. The UE may be configured to determine to provide feedback regarding receipt of the PDCP PDUs, e.g., based, at least in part, on an occurrence of at least one condition (e.g., of at least one triggering event). The at least one condition may include any, any combination of, and/or all of the UE receiving, from the network, a request for feedback, the UE determining that at least one PDCP PDU of the one or more PDCP PDUs is missing, the UE determining that a number of missing PDCP PDUs of the one or more PDCP PDUs exceeds a threshold, and/or the UE determining that a PDCP reordering window is changing based on expiration of a PDCP reordering timer. In some embodiments, the at least one condition may occur during a network configured time period since prior feedback associated with prior receipt of PDCP PDUs via the PTM was transmitted. In such instances, transmission of the feedback associate with receipt of the one or more PDCP PDUs may occur at the expiration of the time period. In addition, the UE may be configured to transmit feedback associated with receipt of the PDCP PDUs to the network. The feedback may include an indication of missing PDCP PDUs. Additionally, the feedback may include an indication of a sequence number associated with at least one missing PDCP PDU.

As another example, in some embodiments, a network entity, such as base station 102, may be configured to transmit PDCP PDUs (e.g., one or more PDCP PDUs) via a PTM link to a UE, such as UE 106. The network entity may be configured receive, from the UE, feedback associated with receipt of the PDCP PDUs. The feedback may include an indication of missing PDCP PDUs. Additionally, the feedback may include an indication of a sequence number associated with at least one missing PDCP PDU. In some embodiments, the feedback associated with receipt of the PDCP PDUs may be responsive to the UE detecting an occurrence of at least one condition (e.g., of at least one triggering event). The at least one condition may include any, any combination of, and/or all of the network entity transmitting, to the UE, a request for feedback, the UE determining that at least one PDCP PDU of the one or more PDCP PDUs is missing, the UE determining that a number of missing PDCP PDUs of the one or more PDCP PDUs exceeds a threshold, and/or the UE determining that a PDCP reordering window is changing based on expiration of a PDCP reordering timer. In some embodiments, the at least one condition may occur during a network configured time period since prior feedback associated with prior receipt of PDCP PDUs via the PTM was transmitted. In such instances, UE transmission of the feedback associate with receipt of the one or more PDCP PDUs may occur at the expiration of the time period. In some embodiments, the threshold may be based on a number of PDCP PDUs transmitted. In some embodiments, the threshold may be configured by the network.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in winch.

Figure 1A:
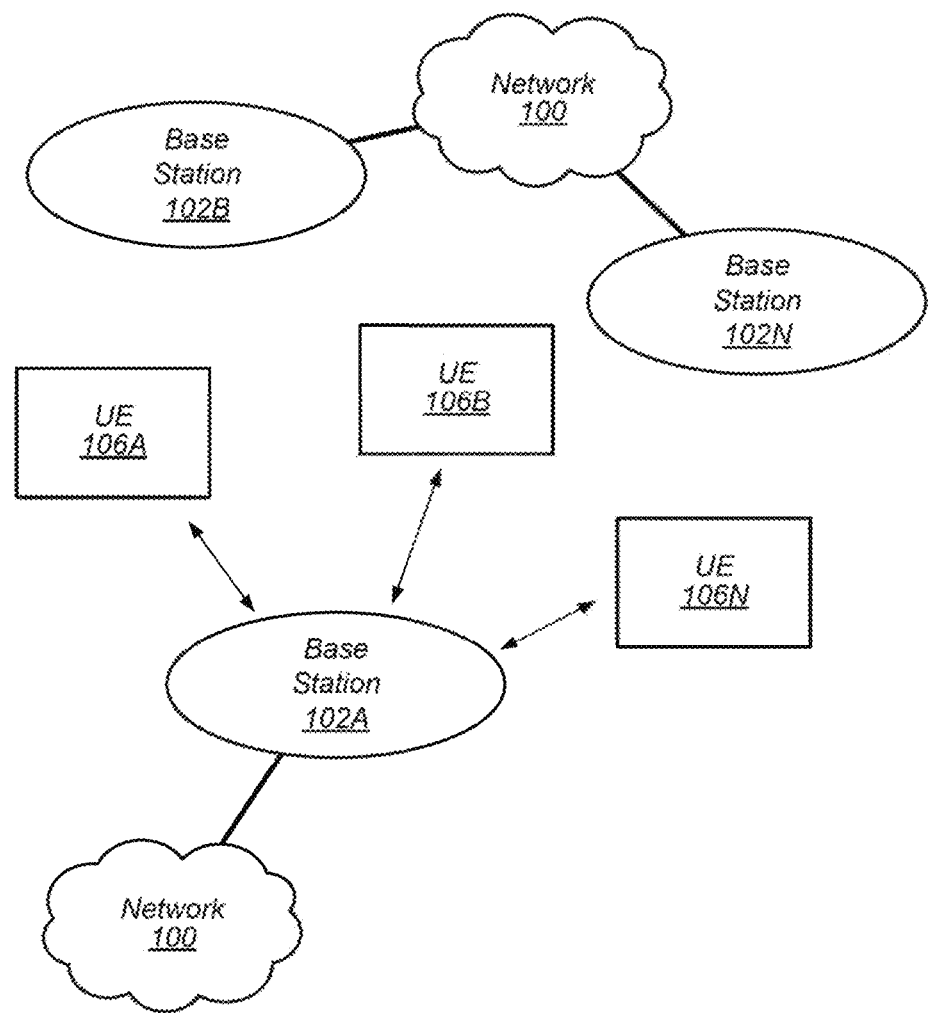
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC/5GCN: 5G Core Network
IE: Information Element
CE: Control Element
MAC: Medium Access Control
SSB: Synchronization Signal Block
CSI-RS: Channel State Information Reference Signal
PDCCH: Physical Downlink Control Channel
PDSCH: Physical Downlink Shared Channel
RRC: Radio Resource Control
RRM: Radio Resource Management
CORESET: Control Resource Set
TCI: Transmission Configuration Indicator
DCI: Downlink Control Indicator Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage, registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
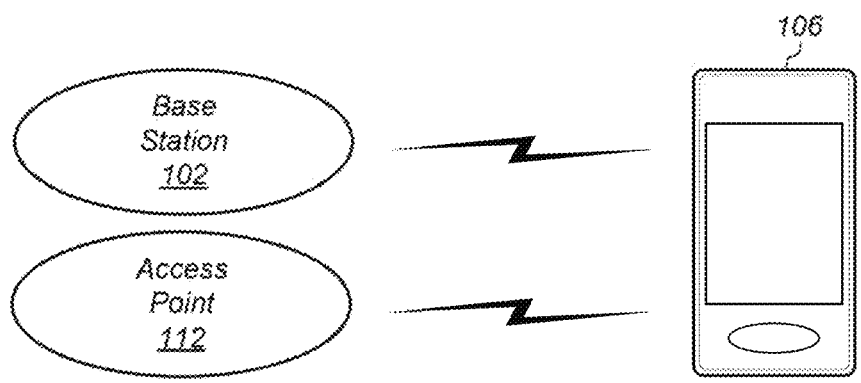
FIG. 1B illustrates an example of a base station and an access point in communication with a user equipment (UE) device, according to some embodiments.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of UE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core, network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/xEV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
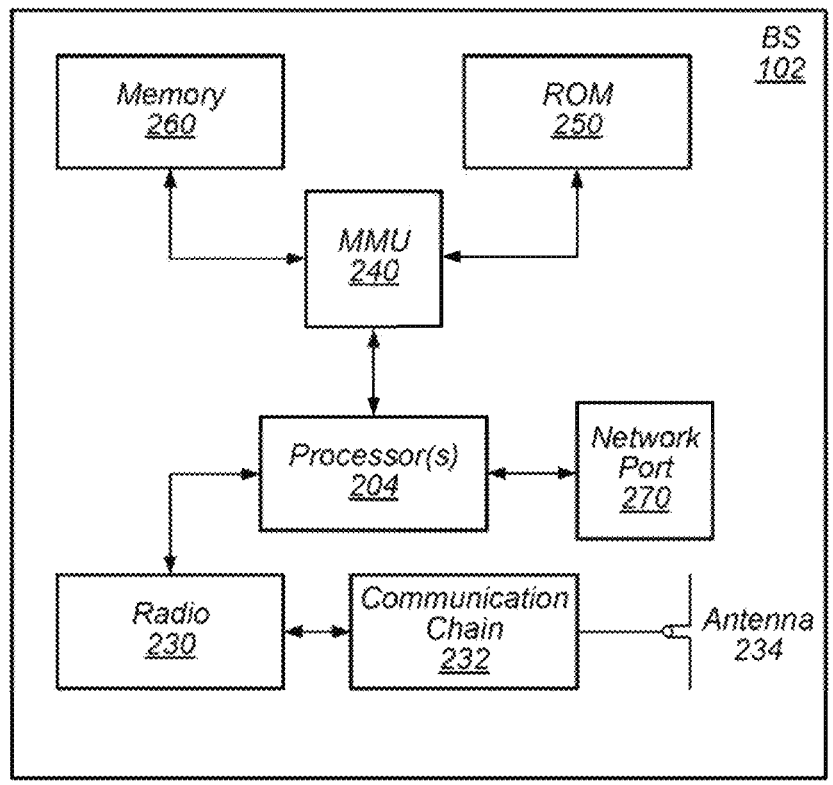
FIG. 2 illustrates an example block diagram of a base station, according to some embodiments.

FIG. 2: Block Diagram of a Base Station

Figure 3:
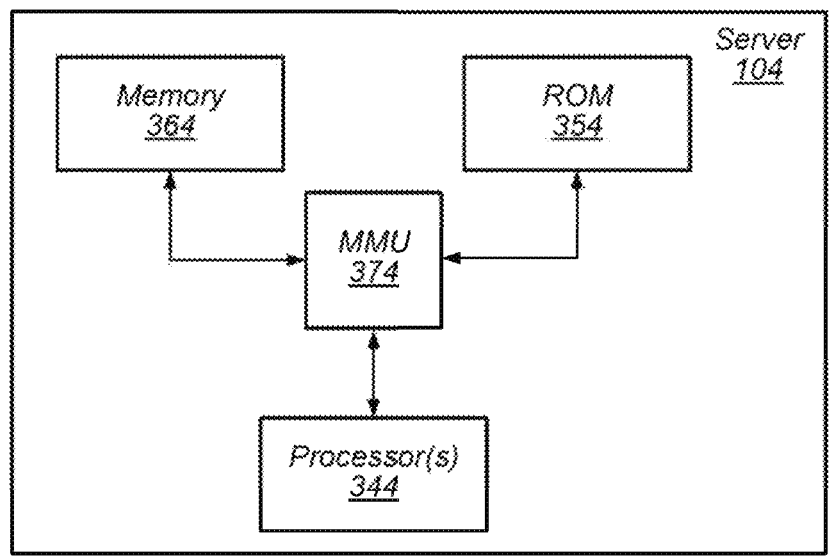
FIG. 3 illustrates an example block diagram of a server according to some embodiments.

FIG. 2 illustrates an example block diagram of a base station 102, according to some embodiments. It is noted that the base station of FIG. 3 is merely one example of a possible base station. As shown, the base station 102 may include processor(s) 204 which may execute program instructions for the base station 102. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The base station 102 may include at least one network port 270. The network port 270 may be configured to couple to a telephone network and provide a plurality of devices, such as UE devices 106, access to the telephone network as described above in FIGS. 1 and 2.

The network port 270 (or an additional network port) may also or alternatively be configured to couple to a cellular network, e.g., a core network of a cellular service provider. The core network may provide mobility related services and/or other services to a plurality of devices, such as UE devices 106. In some cases, the network port 270 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 234, and possibly multiple antennas. The at least one antenna 234 may be configured to operate as a wireless transceiver and may be further configured to communicate with UE devices 106 via radio 230. The antenna 234 communicates with the radio 230 via communication chain 232. Communication chain 232 may be a receive chain, a transmit chain or both. The radio 230 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE, and CDMA2000, UMTS and GSM, etc.).

As described further subsequently herein, the BS 102 may include hardware and software components for implementing or supporting implementation of features described herein. The processor 204 of the base station 102 may be configured to implement or support implementation of part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof. Alternatively (or in addition) the processor 204 of the BS 102, in conjunction with one or more of the other components 230, 232, 234, 240, 250, 260, 270 may be configured to implement or support implementation of part or all of the features described herein.

In addition, as described herein, processor(s) 204 may be comprised of one or more processing elements. In other words, one or more processing elements may be included in processor(s) 204. Thus, processor(s) 204 may include one or more integrated circuits (ICs) that are configured to perform the functions of processor(s) 204. In addition, each integrated circuit may include circuitry (e.g., first circuitry, second circuitry, etc.) configured to perform the functions of processor(s) 204.

Further, as described herein, radio 230 may be comprised of one or more processing elements. In other words, one or more processing elements may be included in radio 230. Thus, radio 230 may include one or more integrated circuits (ICs) that are configured to perform the functions of radio 230. In addition, each integrated circuit may include circuitry (e.g., first circuitry, second circuitry, etc.) configured to perform the functions of radio 230.

FIG. 3: Block Diagram of a Server

FIG. 3 illustrates an example block diagram of a server 104, according to some embodiments. It is noted that the server of FIG. 3 is merely one example of a possible server. As shown, the server 104 may include processor(s) 344 which may execute program instructions for the server 104. The processor(s) 344 may also be coupled to memory management unit (MMU) 374, which may be configured to receive addresses from the processor(s) 344 and translate those addresses to locations in memory (e.g., memory 364 and read only memory (ROM) 154) or to other circuits or devices.

The server 104 may be configured to provide a plurality of devices, such as base station 102, UE devices 106, and/or UTM 108, access to network functions, as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 344 of the server 104 may be configured to implement or support implementation of part or all of the methods described, herein, e.g., by executing program instructions stored on a memory medium (e.g., a non-transitory computer-readable memory medium). Alternatively, the processor 344 may be configured as a programmable hardware element, such as an FPGA (Field Programmable Gate Array), or as an ASIC (Application Specific Integrated Circuit), or a combination thereof. Alternatively (or in addition) the processor 344 of the server 104, in conjunction with one or more of the other components 354, 364, and/or 374 may be configured to implement or support implementation of part or all of the features described herein.

In addition, as described herein, processor(s) 344 may be comprised of one or more processing elements. In other words, one or more processing elements may be included in processor(s) 344. Thus, processor(s) 344 may include one or more integrated circuits (ICs) that are configured to perform the functions of processor(s) 344. In addition, each integrated circuit may include circuitry (e.g., first circuitry, second circuitry, etc.) configured to perform the functions of processor(s) 344.

Figure 4:
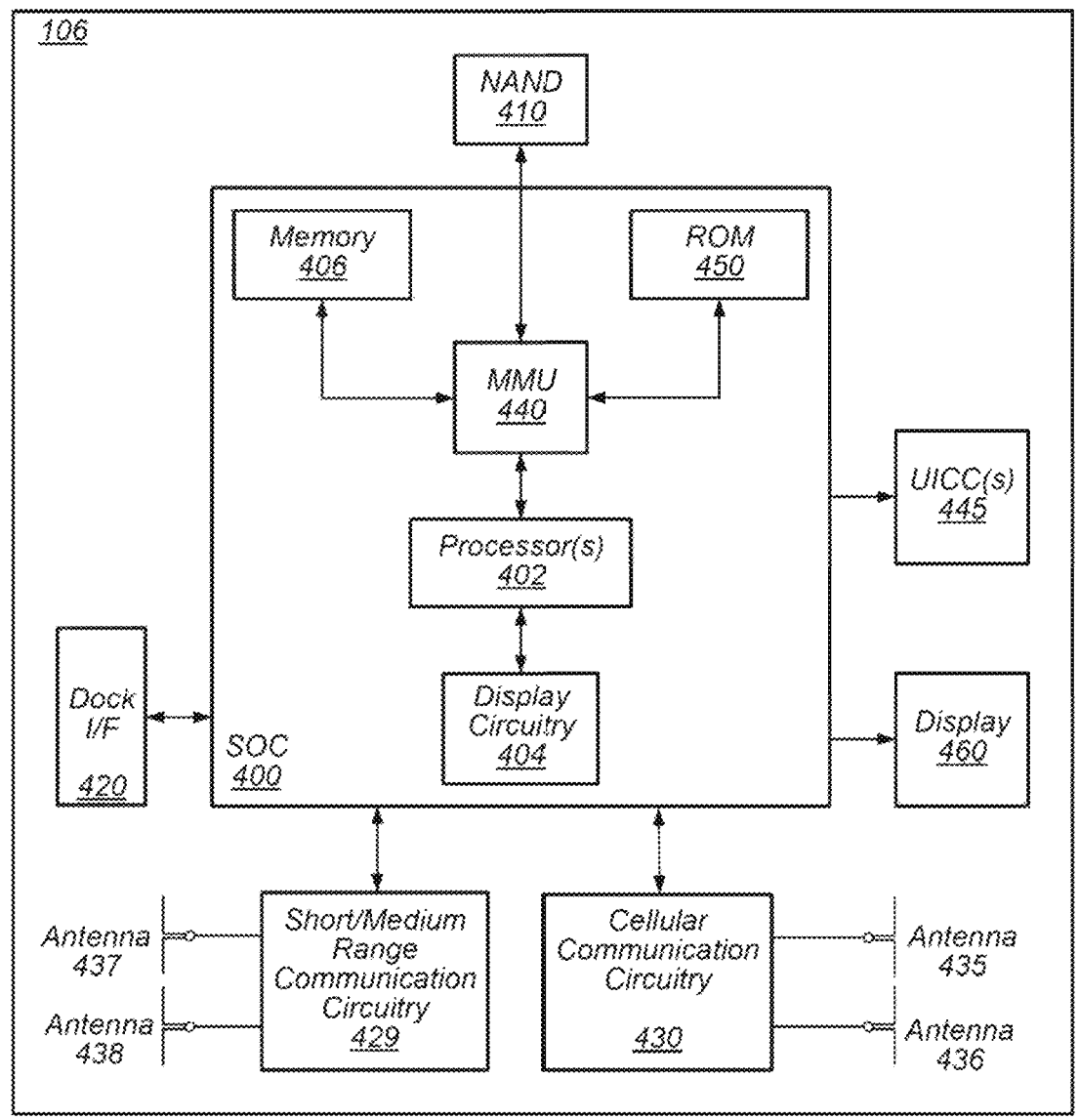
FIG. 4 illustrates an example block diagram of a UE according to some embodiments.

FIG. 4: Block Diagram of a UE

FIG. 4 illustrates an example simplified block diagram of a communication device 106, according to some embodiments. It is noted that the block diagram of the communication device of FIG. 4 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 400 configured to perform core functions. For example, this set of components may be implemented as a system on chip (SOC), which may include portions for various purposes. Alternatively, this set of components 400 may be implemented as separate components or groups of components for the various purposes. The set of components 400 may be coupled (e.g., communicatively; directly or indirectly) to various other circuits of the communication device 106.

For example, the communication device 106 may include various types of memory (e.g., including NAND flash 410), an input/output interface such as connector I/F 420 (e.g., for connecting to a computer system; dock; charging station; input devices, such as a microphone, camera, keyboard; output devices, such as speakers etc.), the display 460, which may be integrated with or external to the communication device 106, and cellular communication circuitry 430 such as for 5G NR, LTE, GSM, etc., and short to medium range wireless communication circuitry 429 (e.g., Bluetooth™ and WLAN circuitry). In some embodiments, communication device 106 may include wired communication circuitry (not shown), such as a network interface card, e.g., for Ethernet.

The cellular communication circuitry 430 may couple (e.g., communicatively; directly or indirectly) to one or more antennas, such as antennas 435 and 436 as shown. The short to medium range wireless communication circuitry 429 may also couple (e.g., communicatively; directly or indirectly) to one or more antennas, such as antennas 437 and 438 as shown. Alternatively, the short to medium range wireless communication circuitry 429 may couple (e.g., communicatively; directly or indirectly) to the antennas 435 and 436 in addition to, or instead of, coupling (e.g., communicatively; directly or indirectly) to the antennas 437 and 438. The short to medium range wireless communication circuitry 429 and/or cellular communication circuitry 430 may include multiple receive chains and/or multiple transmit chains for receiving and/or transmitting multiple spatial streams, such as in a multiple-input multiple output (MIMO) configuration.

In some embodiments, as further described below, cellular communication circuitry 430 may include dedicated receive chains (including and/or coupled to, e.g., communicatively; directly or indirectly, dedicated processors and/or radios) for multiple RATs (e.g., a first receive chain for LTE and a second receive chain for 5G NR). In addition, in some embodiments, cellular communication circuitry 430 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 445 that include SIM (Subscriber Identity Module) functionality, such as one or more UICC(s) (Universal Integrated Circuit Card(s)) cards 445. Note that the term "SIM" or "SIM entity" is intended to include any of various types of SIM implementations or SIM functionality, such as the one or more UICC(s) cards 445, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 410 may be implemented as a removable smart card. Thus, the SIM(s) may be one or more removable smart cards (such as UICC cards, which are sometimes referred to as "SIM cards"), and/or the SIMs 410 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMs. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM 410 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 400 may include processor(s) 402, which may execute program instructions for the communication device 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, short to medium range wireless communication circuitry 429, cellular communication circuitry 430, connector I/F 420, and/or display 460. The MMU 440 may be configured to perform memory protection and page table translation or set up. In some embodiments, the MMU 440 may be included as a portion of the processor(s) 402.

As noted above, the communication device 106 may be configured to communicate using wireless and/or wired communication circuitry. The communication device 106 may be configured to perform methods for enhancement of MBMS transmission reliability, e.g., in 5G NR systems and beyond, as further described herein.

As described herein, the communication device 106 may include hardware and software components for implementing the above features for a communication device 106 to communicate a scheduling profile for power savings to a network. The processor 402 of the communication device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the communication device 106, in conjunction with one or more of the other components 400, 404, 406, 410, 420, 429, 430, 440, 445, 450, 460 may be configured to implement part or all of the features described herein.

In addition, as described herein, processor 402 may include one or more processing elements. Thus, processor 402 may include one or more integrated circuits (ICs) that are configured to perform the functions of processor 402. In addition, each integrated circuit may include circuitry (e.g., first circuitry, second circuitry, etc.) configured to perform the functions of processor(s) 402.

Further, as described herein, cellular communication circuitry 430 and short to medium range wireless communication circuitry 429 may each include one or more processing elements. In other words, one or more processing elements may be included in cellular communication circuitry 430 and, similarly, one or more processing elements may be included in short to medium range wireless communication circuitry 429. Thus, cellular communication circuitry 430 may include one or more integrated circuits (ICs) that are configured to perform the functions of cellular communication circuitry 430. In addition, each integrated circuit may include circuitry (e.g., first circuitry, second circuitry, etc.) configured to perform the functions of cellular communication circuitry 430. Similarly, the short to medium range wireless communication circuitry 429 may include one or more ICs that are configured to perform the functions of short to medium range wireless communication circuitry 429. In addition, each integrated circuit may include circuitry (e.g., first circuitry, second circuitry, etc.) configured to perform the functions of short to medium range wireless communication circuitry 429.

Figure 5:
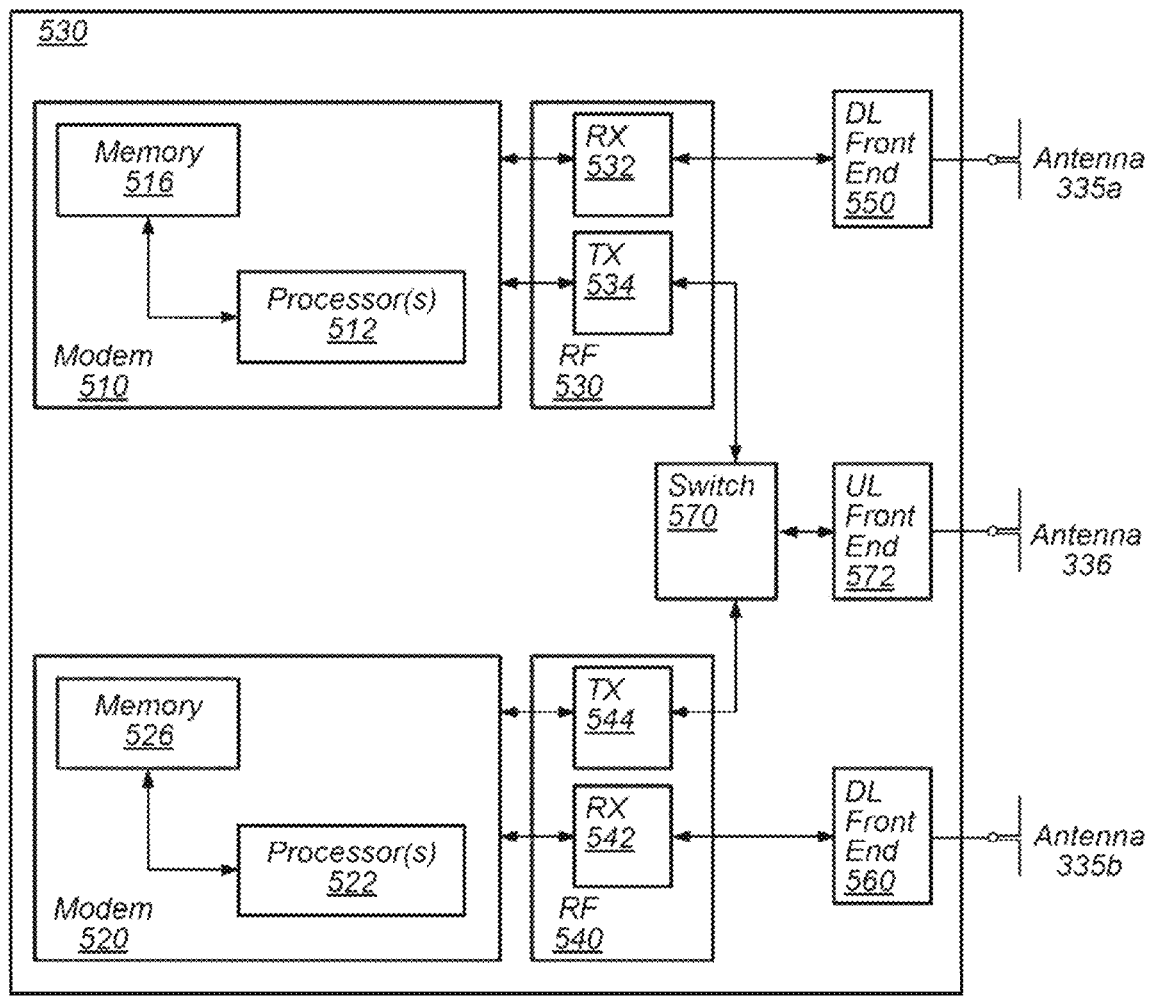
FIG. 5 illustrates an example block diagram of cellular communication circuitry, according to some embodiments.

FIG. 5: Block Diagram of Cellular Communication Circuit

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 530, which may be cellular communication circuitry 430, may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 530 may couple (e.g., communicatively; directly or indirectly) to one or more antennas, such as antennas 435a-b and 436 as shown (in FIG. 4). In some embodiments, cellular communication circuitry 530 may include dedicated receive chains (including and/or coupled to, e.g., communicatively; directly or indirectly, dedicated processors and/or radios) for multiple RATs (e.g., a first receive chain for LTE and a second receive chain for 5G NR). For example, as shown in FIG. 5, cellular communication circuitry 530 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signal. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 530 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 530 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 530 may be configured to perform methods enhancement of MBMS transmission reliability, e.g., in 5G NR systems and beyond, as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively for in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
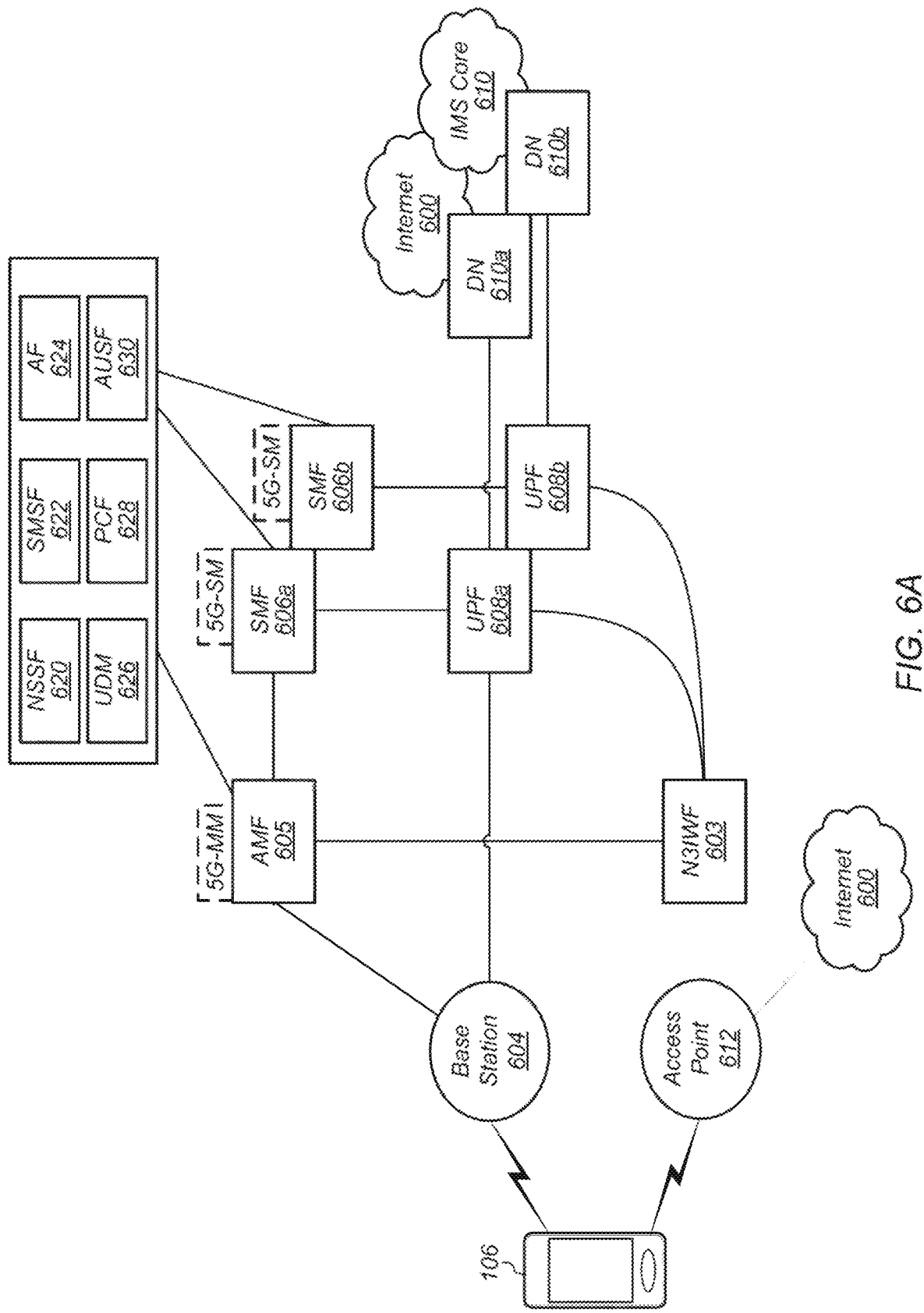
FIG. 6A illustrates an example of a 5G network architecture that incorporates both 3GPP (e.g., cellular) and non-3GPP (e.g., non-cellular) access to the 5G CN, according to some embodiments.
Figure 6B:
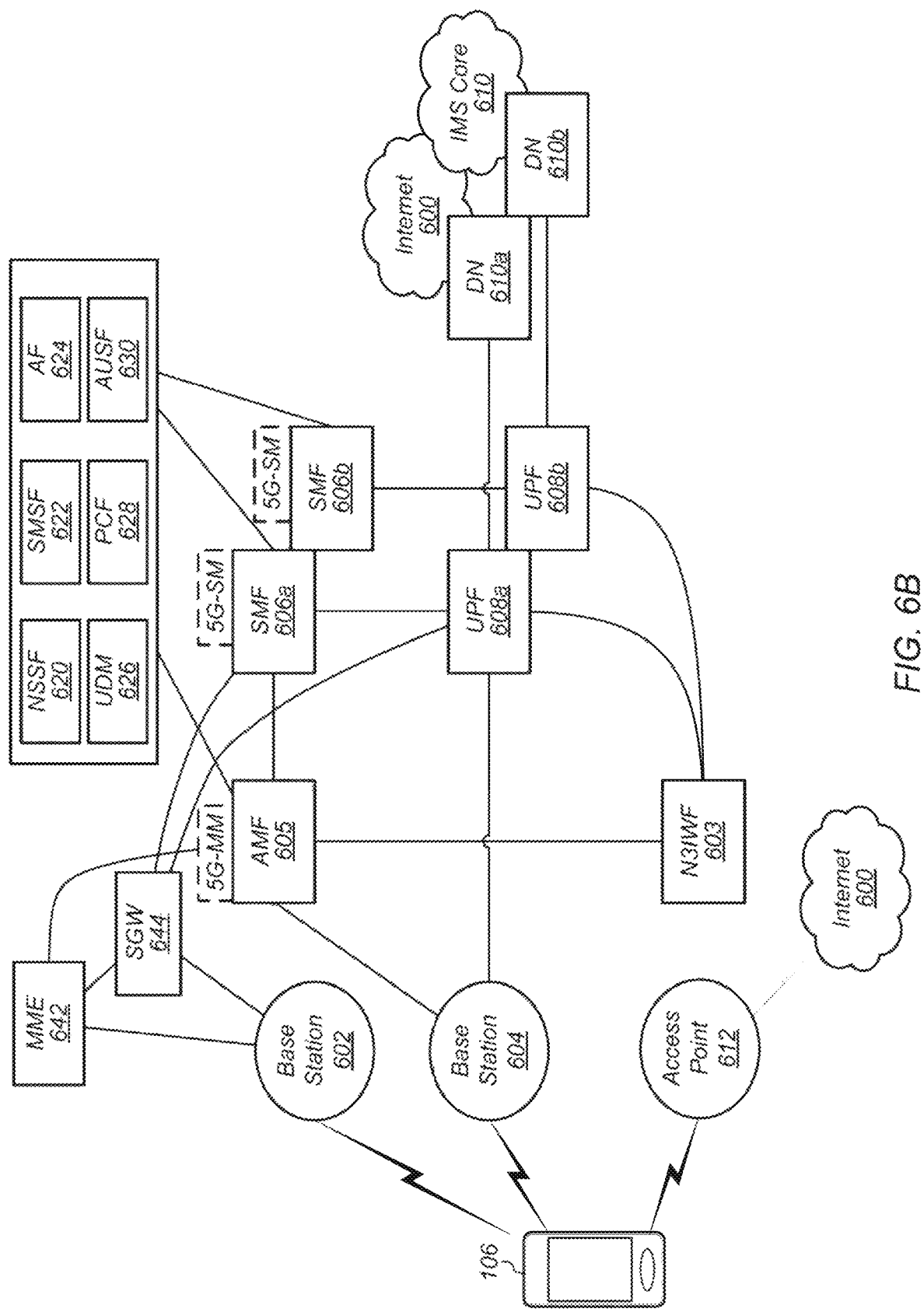
FIG. 6B illustrates an example of a 5G network architecture that incorporates both dual 3GPP (e.g., LTE and 5G NR) access and non-3GPP access to the 5G CN, according to some embodiments.
Figure 7:
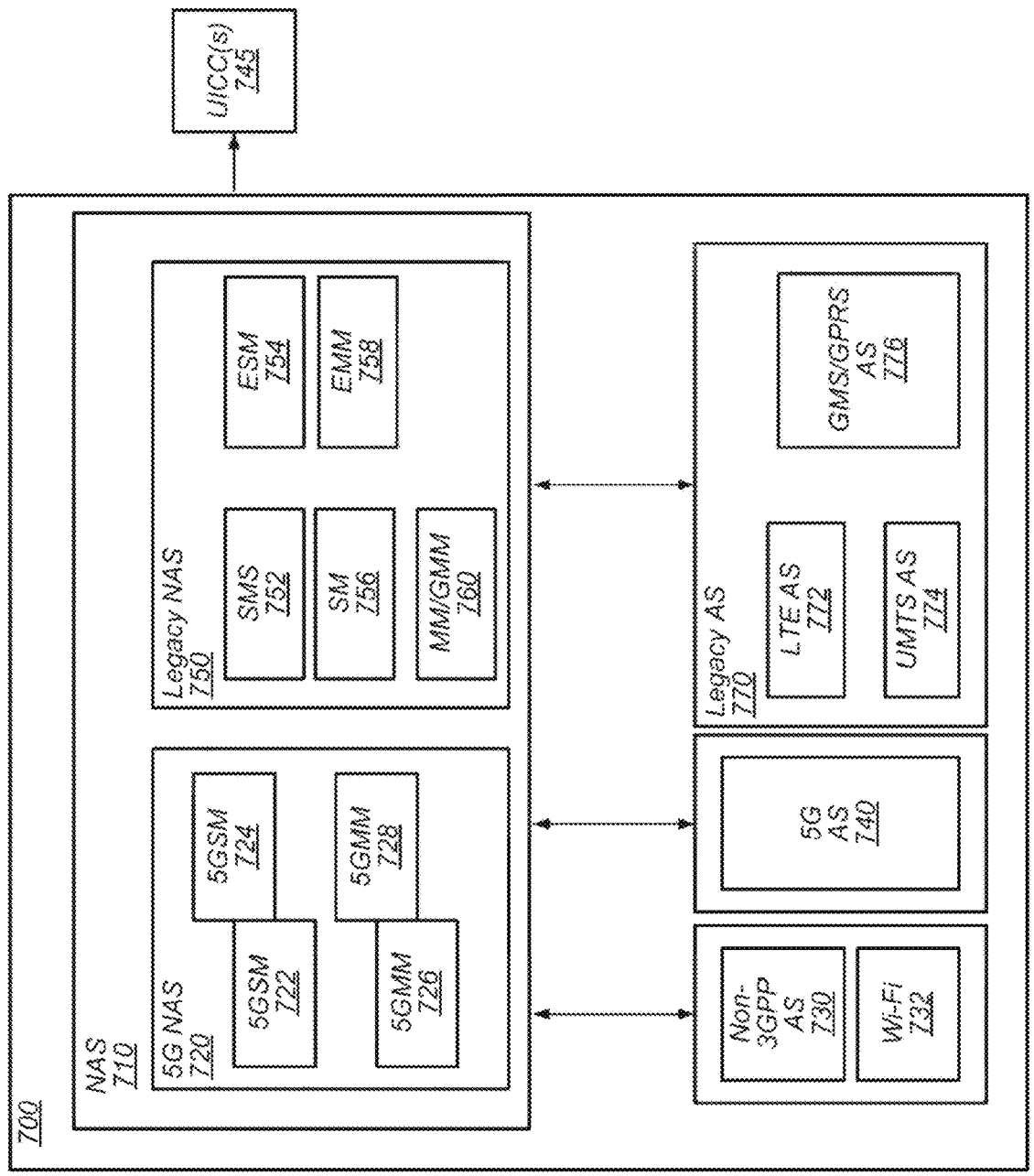
FIG. 7 illustrates an example of a baseband processor architecture for a UE, according to some embodiments.

FIGS. 6A, 6B and 7: 5G Core Network Architecture—Interworking with Wi-Fi

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 6A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB 604, which may be a base station 102) and an access point, such as AP 612. The AP 612 may include a connection to the Internet 600 as well as a connection to a non-3GPP inter-working function (N3IWF) 603 network entity. The N3IWF may include a connection to a core access and mobility management function (AMF) 605 of the 5G CN. The AMF 605 may include an instance of a 5G mobility management (5G MM) function associated with the UE 106. In addition, the RAN (e.g., gNB 604) may also have a connection to the AMF 605. Thus, the 5G CN may support unified authentication over both connections as well as allow simultaneous registration for UE 106 access via both gNB 604 and AP 612. As shown, the AMF 605 may include one or more functional entities associated with the 5G CN (e.g., network slice selection function (NSSF) 620, short message service function (SMSF) 622, application function (AF) 624, unified data management (UDM) 626, policy control function (PCF) 628, and/or authentication server function (AUSF) 630). Note that these functional entities may also be supported by a session management function (SMF) 606a and an SMF 606b of the 5G CN. The AMF 605 may be connected to (or in communication with) the SMF 606a. Further, the gNB 604 may in communication with (or connected to) a user plane function (UPF) 608a that may also be communication with the SMF 606a. Similarly, the N3IWF 603 may be communicating with a UPF 608b that may also be communicating with the SMF 606b. Both UPFs may be communicating with the data network (e.g., DN 610a and 610b) and/or the Internet 600 and Internet Protocol (IP) Multimedia Subsystem/IP Multimedia Core Network Subsystem (IMS) core network 610.

FIG. 6B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB 604 or eNB 602, which may be a base station 102) and an access point, such as AP 612. The AP 612 may include a connection to the Internet 600 as well as a connection to the N3IWF 603 network entity. The N3IWF may include a connection to the AMF 605 of the 5G CN. The AMF 605 may include an instance of the 5G MM function associated with the UE 106. In addition, the RAN (e.g., gNB 604) may also have a connection to the AMF 605. Thus, the 5G CN may support unified authentication over both connections as well as allow simultaneous registration for UE 106 access via both gNB 604 and AP 612. In addition, the 5G CN may support dual-registration of the UE on both a legacy network (e.g., LTE via eNB 602) and a 5G network (e.g., via gNB 604). As shown, the eNB 602 may have connections to a mobility management entity (MME) 642 and a serving gateway (SGW) 644. The MME 642 may have connections to both the SGW 644 and the AMF 605. In addition, the SGW 644 may have connections to both the SMF 606 a and the UPF 608 a. As shown, the AMF 605 may include one or more functional entities associated with the 5G CN (e.g., NSSF 620, SMSF 622, AF 624, UDM 626, PCF 628, and/or AUSF 630). Note that UDM 626 may also include a home subscriber server (HSS) function and the PCF may also include a policy and charging rules function (PCRF). Note further that these functional entities may also be supported by the SMF606 a and the SMF 606 b of the 5G CN. The AMF 606 may be connected to (or in communication with) the SMF 606 a. Further, the gNB 604 may in communication with (or connected to) the UPF 608 a that may also be communication with the SMF 606 a. Similarly, the N3IWF 603 may be communicating with a UPF 608 b that may also be communicating with the SMF 606 b. Both UPFs may be communicating with the data network (e.g., DN 610 a and 610 b) and/or the Internet 600 and IMS core network 610.

Note that in various embodiments, one or more of the above described network entities may be configured to perform methods to improve security checks in a 5G NR network, including mechanisms enhancement of MBMS transmission reliability, e.g., in 5G NR systems and beyond, e.g., as further described herein.

FIG. 7 illustrates an example of a baseband processor architecture for a UE (e.g., such as UE 106), according to some embodiments. The baseband processor architecture 700 described in FIG. 7 may be implemented on one or more radios (e.g., radios 429 and/or 430 described above) or modems (e.g., modems 510 and/or 520) as described above. As shown, the non-access stratum (NAS) 710 may include a 5G NAS 720 and a legacy NAS 750. The legacy NAS 750 may include a communication connection with a legacy access stratum (AS) 770. The 5G NAS 720 may include communication connections with both a 5G AS 740 and a non-3GPP AS 730 and Wi-Fi AS 732. The 5G NAS 720 may include functional entities associated with both access stratums. Thus, the 5G NAS 720 may include multiple 5G MM entities 726 and 728 and 5G session management (SM) entities 722 and 724. The legacy NAS 750 may include functional entities such as short message service (SMS) entity 752, evolved packet system (EPS) session management (ESM) entity 754, session management (SM) entity 756, EPS mobility management (EMM) entity 758, and mobility management (MM)/GPRS mobility management (GMM) entity 760. In addition, the legacy AS 770 may include functional entities such as LTE AS 772, UMTS AS 774, and/or GSM/GPRS AS 776.

Thus, the baseband processor architecture 700 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G MM procedures (e.g., registration, de-registration, identification, authentication, as so forth) for both accesses.

Note that in various embodiments, one or more of the above described functional entities of the 5G NAS and/or 5G AS may be configured to perform methods enhancement of MBMS transmission reliability, e.g., in 5G NR systems and beyond, e.g., as further described herein.

MBMS Transmission Reliability Enhancement

Multimedia Broadcast Multicast Services (MBMS) is a point-to-multipoint interface specification for existing and upcoming 3GPP cellular networks. MEMS is designed to provide efficient delivery of broadcast and multicast services, both within a cell as well as within a core network. MBMS defines transmission via single-frequency network configurations for broadcast transmission across multiple cells. The specification is referred to as Evolved Multimedia Broadcast Multicast Services (eMBMS) when transmissions are delivered through an LTE (Long Term Evolution) network and eMBMS is also known as LTE Broadcast. Target applications of MBMS include mobile TV, radio broadcasting, live streaming video services, as well as file delivery and emergency alerts.

MBMS is split into an MBMS Bearer Service and an MBMS User Service and has been defined to be offered over both UTRAN (i.e. WCDMA, TD-CDMA and TD-SCDMA) and LTE (where it is often referred to as eMBMS). The MBMS Bearer Service is defined by 3GPP TS 22.146, 23.246 25.346, 25.992, 36.300, 36.440, and 43.246, as well as 4GPP TR 25.503. The MBMS User Service is defined by 3GPP 22.246, 26.346, 33.246, and 32.273, as well as 3GPP TR 26.946.

In addition to MBMS, 3GPP also specifies a single cell point-to-multipoint (SC-PTM) transmission scheme. SC-PTM uses the eMBMS system architecture, providing enhancements in the air interface to improve radio efficiency and to reduce latency. SC-PTM also supports broadcast/multicast services over single cell and the broadcast/multicast area can be dynamically adjusted cell by cell according to user distribution. According to the specifications, SC-PTM transfers broadcast/multicast services using a downlink shared channel (e.g., such as PDSCH) and it is scheduled using a common RNTI (e.g., a group-RNTI) for a group of users. The SC-PTM scheduling is considered agile and radio resources can be dynamically assigned in time and frequency domain by PDCCH based on real time traffic load transmit time interval (TTI) TTI by TTI. In particular, SC-PTM may be suitable for scenarios in winch broadcast/multicast service is expected to be delivered to a limited number of cells due to user interests and the cells may dynamically change due to user movement, SC-PTM defined by at least 3GPP TS 22.468, 22.179, and 23.468, as well as 3GPP TR 36.890.

However, as defined by the standards, in both SC-PTM and MBMS, there is not any retransmission or feedback scheme to ensure transmission reliability. For example, current layer 2 (L2) architecture does not support Packet Data Convergence Protocol (PDCP) layer feedback or retransmission for SC-PTM or MBMS. Similarly, current MAC layer does not support hybrid automatic repeat request (HARQ) feedback or retransmission for SC-PTM or MBMS. Further, current radio link control (RLC) layer does not support feedback (e.g., RLC ARQ) or retransmission.

Embodiments described herein provide systems, method, and mechanisms for enhancement of MBMS transmission reliability, e.g., in 5G NR systems and beyond. In some embodiments, a UE, such as UE 106, may provide feedback of a point-to-multipoint (PTM) link to a network, e.g., to help and/or aid the network in adjustment of a transmission scheme for a Multimedia Broadcast Multicast Service (MBMS). The feedback of the PTM link may include one or more types. For example, a first type (e.g., type 1 feedback) may include MBMS reception status, a second type (e.g., type 2 feedback) may include radio quality of the PTM link, and a third type (e.g., type 3 feedback) may include UE preference on an MBMS transmission via PTM or a point-to-point (PTP) transmission. For type 1 feedback, the UE may provide the network with an RLC status report, e.g., if the PTM transmission is configured via RLC acknowledge mode (RLC-AM), a PDCP status report of an MBMS specific dedicated radio bearer (DRB) (e.g., such as a multipoint radio bearer (MRB)), and/or MAC HARQ feedback for an MEMS specific transmission. For type 2 feedback, the UE may provide layer 3 (L3) radio resource management (RRM) measurements, e.g., where the network may configure a PTM specific measurement configuration and object, and/or a layer 1 (L1) channel state information (CSI) report, e.g., where the network may configure a measurement on a PTM specific resource. For type 3 feedback, the UE may perform an internal feedback evaluation to provide the network with a preference between MBMS transmission via PTM or a PTP transmission. In some embodiments, based on the feedback from the UE, the network (e.g., a base station of the network, such as base station 102, and/or another network entity as described herein) may adjust PTM scheduling and/or adjust allocated physical resource block (PRB) number and/or modulation and coding scheme (MCS). Additionally, based on the feedback from the UE, the network may perform a retransmission if a packet is missing. In addition, based on the feedback from the UE, the network may switch the transmission to a PTP transmission, e.g. if a PTM transmission quality is worse than a PTP transmission quality. In some embodiments, to detect PTM link failure, radio link failure (RLF) and RLC-AM may be introduced for PTM transmissions. Thus, upon detection of a PTM link failure, the UE can report failure information and the network may perform link switching and/or reconfigure PTM link resources.

In some embodiments, a UE, such as UE 106, may provide feedback, via a PDCP layer of the UE, for MBMS reception status for each MBMS specific dedicated resource bearer (DRB), e.g., for each multipoint resource bearer (MRB), configured by a network for point-to-multipoint (PTM) transmission to the UE. In other words, the UE PDCP layer may provide feedback for MBMS reception status for each MRB. The feedback may include a reordering window situation (e.g., low edge, high edge, and/or gap), including missing PDCP sequence number and/or count. The UE may also indicate, for missing PDUs, a cause for the missing PDU, e.g., such as not received or a security checking failure.

In some embodiments, transmission of the PDCP feedback may be via an uplink dedicated link. Note that, for an MRB configured with PTM-RLC unacknowledged mode (UM), the network may configure a peer PTM-RLC UM entity for the PDCP feedback transmission. Note further that, for an MRB configured with PTM-RLC AM, the PDCP feedback may be transmitted via the PTM-RLC AM (e.g., the PTM-RLC AM may support both uplink and downlink). Note additionally that, if and/or when an MRB configured with both PTM-RLC and PTP-RLC, the PDCP feedback may be transmitted via the PTP-RLC entity.

In some embodiments, upon receiving the PDCP feedback (e.g., a PDCP status report), the network may retransmit missing PDUs (e.g., as indicated in the PDCP feedback) to UE via the PTM and/or PTP link. Note that, for retransmission via a PTP link, the PTM and PTP link may be linked together with the same MRB PDCP entity. Additionally, on the UE side, a PDCP reordering window and PDCP sequence number allocation may be common for both the PTP and PTM link.

In some embodiments, the PDCP feedback (e.g., PDCP status report) may be triggered based on a network explicit request, a network configured condition, and/or UE detection of a PTM link failure. Network configured conditions may include UE detection of missing PDCP protocol data units (PDUs), UE detection of missing PDCP protocol data units (PDUs) exceeding a threshold (e.g., N missing PDCP PDUs, where N may be network configurable), UE detection that a PDCP reordering window may be moving, e.g., due ta a reordering timer expiring, and/or periodically based on a network configured periodic timer.

Figure 8A:
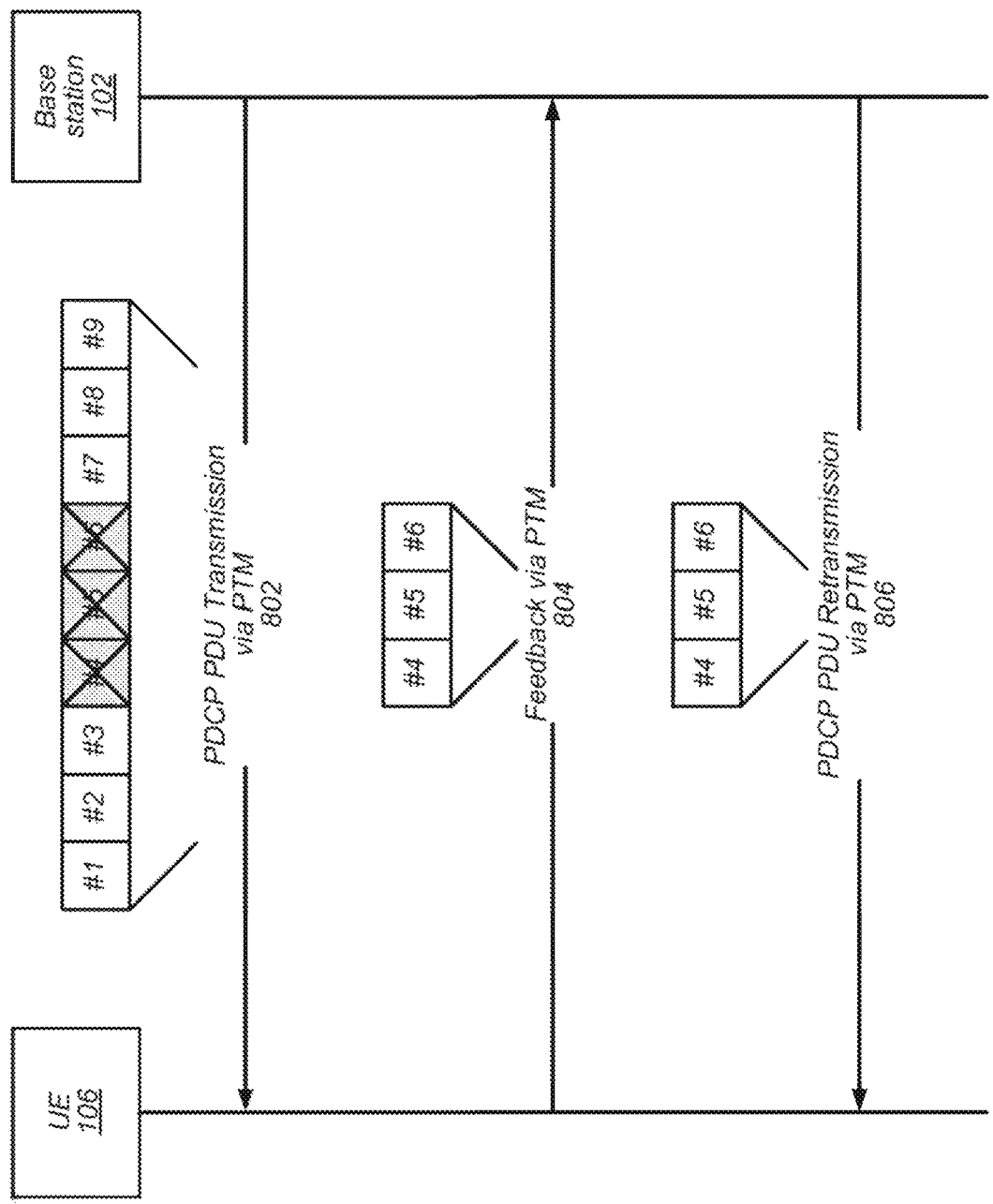
FIG. 8A illustrates an example of signaling for PDCP feedback and retransmission for a PTM transmission, according to some embodiments.
Figure 8C:
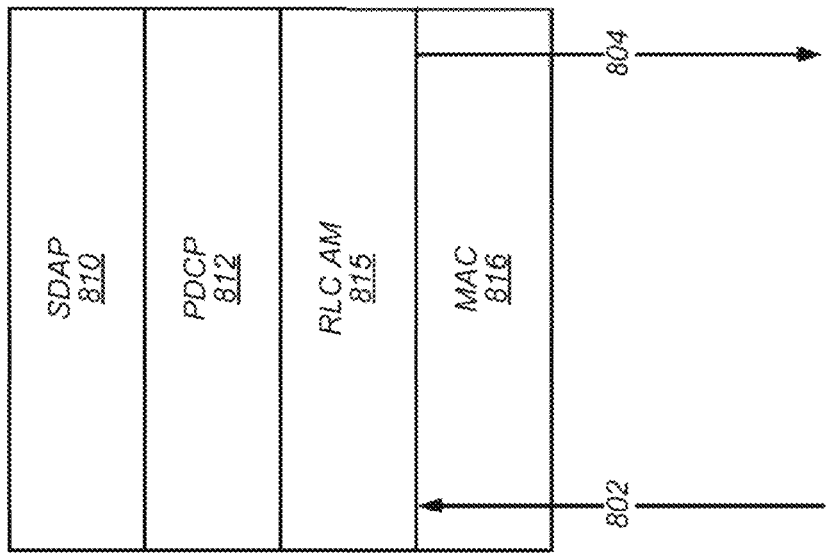
FIGS. 8B and 8C illustrate examples of L2 architectures of a UE that may be used in conjunction with the signaling of FIG. 9A, according to some embodiments.
Figure 8B:
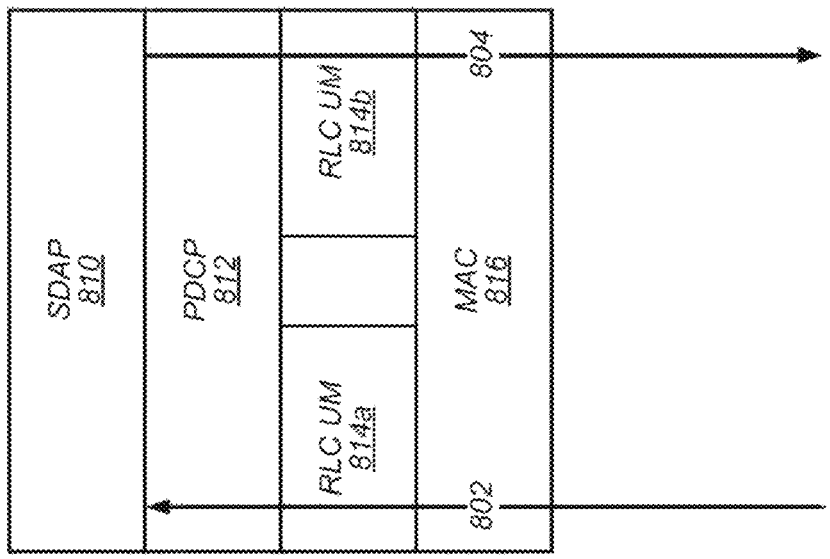

FIG. 8A illustrates an example of signaling for PDCP feedback and retransmission for a PTM transmission, according to some embodiments. The signaling shown in FIG. 8A may be used in conjunction with any of the systems, methods, or devices shown in the Figures, among other devices. In particular, FIGS. 8B and 8C illustrate examples of layer 2 (L2) architectures of a UE, such as UE 106, that may be used in conjunction with the signaling of FIG. 8A, according to same embodiments. In various embodiments, some of the signaling shown may be performed concurrently, in a different order than shown, or may be omitted. Additional signaling may also be performed as desired. As shown, this signaling may flow as follows.

Turning to FIG. 8A, at 802, a UE, such as UE 106, may receive a PDCP protocol data unit (PDU) PTM transmission from a base station (e.g., from a network via the base station), such as base station 102. The PDCP PDU PTM transmission may include PDUs #1-#9. However, PDUs #4-#6 may not be received by the UE, as shown. Thus, at 804, the UE may provide feedback to the base station via the PTM with an indication that PDUs #4-#6 were not received. At 806, in response to the feedback, the UE may receive a PDCP PDU PTM retransmission from the base station, where the PDCP PDU PTM retransmission includes PDUs #4-#6.

As shown in FIG. 8B, in some embodiments, an L2 architecture of a UE, such as UE 106, may include a Service Data Adaptation Protocol (SDAP) entity 810, a PDCP entity 812, a radio link control (RLC) UM entity 814*a* for downlink, an RLC UM entity 814*b* for uplink, and a MAC entity 816. In such an architecture, the UE may receive the PDCP PDU PTM transmission 802 at PDCP entity 812 via RLC UM entity 814*a* and MAC entity 816 and pass the PDCP PDU PTM transmission to SDAP entity 810. Similarly, the UE may transmit feedback via the PTM originating from PDCP entity 812 via RLC UM entity 814*b* and MAC entity 816. Thus, as shown, the L2 architecture of the UE may include an RLC UM entity for uplink and downlink (e.g., peer RLC UM entities) in order to support PTM feedback.

Alternatively, as shown in FIG. 8C, in some embodiments, L2 architecture of a UE, such as UE 106, may include the SDAP entity 810, the PDCP entity 812, an RLC AM entity 815 supporting both uplink and downlink, and the MAC entity 816. In such an architecture, the UE may receive the PDCP PDU PTM transmission 802 at PDCP entity 812 via RLC AM entity 815 and MAC entity 816 and pass the PDCP PDU PTM transmission to SDAP entity 810. Similarly, the UE may transmit feedback via the PTM originating from PDCP entity 812 via RLC AM entity 815 and MAC entity 816. Thus, as shown, the L2 architecture of the UE may include an RLC AM entity supporting both uplink and downlink (e.g., peer RLC AM entities) in order to support PTM feedback.

Figure 9A:
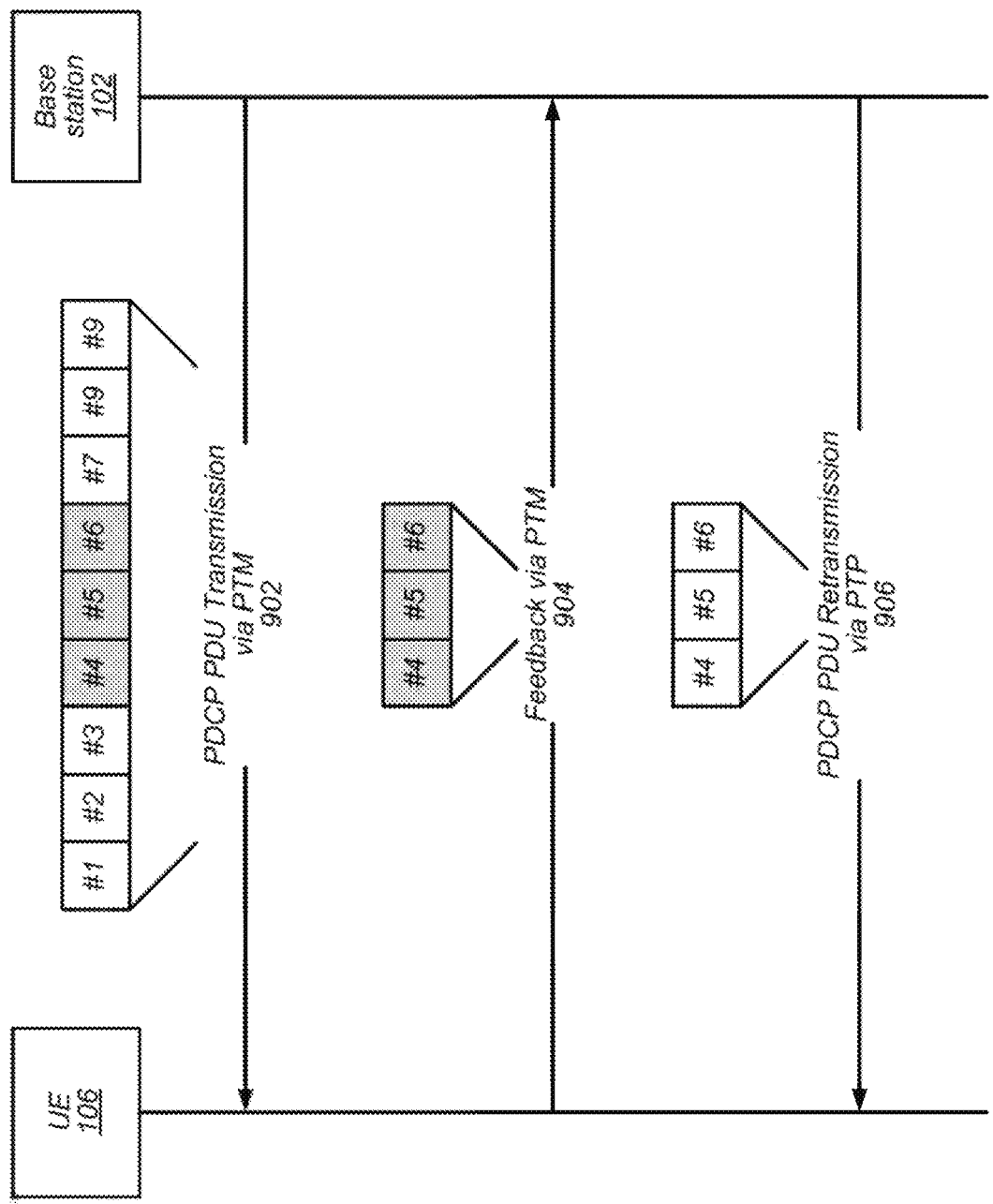
FIG. 9A illustrates an example of signaling for PDCP feedback and retransmission for a PTM transmission, according to some embodiments.
Figure 9C:
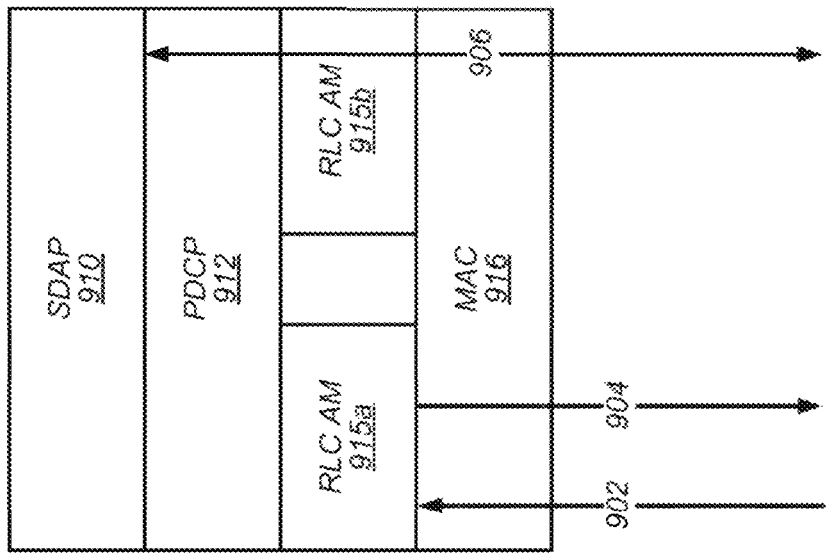
FIGS. 9B and 9C illustrate examples of L2 architectures of a UE that may be used in conjunction with the signaling of FIG. 9A, according to some embodiments.
Figure 9B:
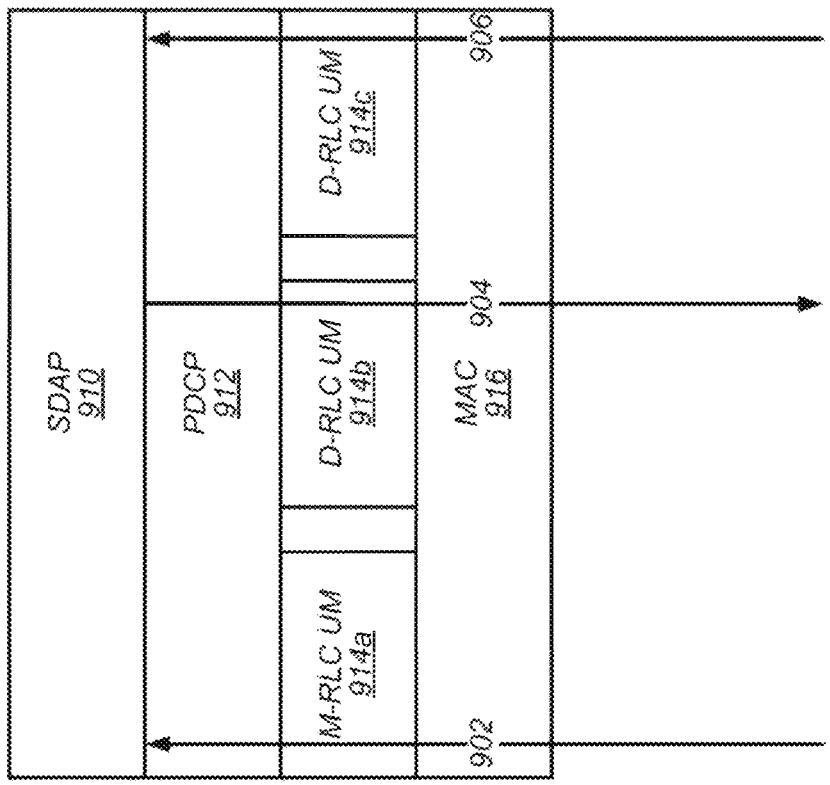

FIG. 9A illustrates another example of signaling for PDCP feedback and retransmission for a PTM transmission, according to some embodiments. The signal shown in FIG. 8A may be used in conjunction with any of the systems, methods, or devices shown in the Figures, among other devices. In particular, FIGS. 9B and 9C illustrate examples of layer 2 (L2) architectures of a UE, such as UE 106, that may be used in conjunction with the signaling of FIG. 9A, according to some embodiments. In various embodiments, some of the signaling shown may be performed concurrently, in a different order than shown, or may be omitted. Additional signaling may also be performed as desired. As shown, this signaling may flow as follows.

Turning to FIG. 9A, at 902, a UE, such as UE 106, may receive a PDCP protocol data unit (PDU) PTM transmission from a base station (e.g., from a network via the base station), such as base station 102. The PDCP PDU PTM transmission may include PDUs #1-#9. However, PDUs #4-#6 may not be received by the UE, as shown. Thus, at 904, the UE may provide feedback to the base station via the PTM with an indication that PDUs #4-#6 were not received. At 906, in response to the feedback, the UE may receive a PDCP PDU PTP retransmission (e.g., via a point-to-point transmission instead of a PTM transmission) from the base station, where the PDCP PDU PTM retransmission includes PDUs #4-#6.

As shown in FIG. 9B, in some embodiments, an L2 architecture of a UE, such as UE 106, may include an SDAP entity 910, a PDCP entity 912, a multilink radio link control (M-RLC) UM entity 914*a* for PTM downlink, a dedicated RLC UM entity 914*b* for uplink, a dedicated RLC UM entity 914*c* for PTP downlink, and a MAC entity 916. In such an architecture, the UE may receive the PDCP PDU PTM transmission 902 at PDCP entity 912 via M-RLC UM entity 914*a* and MAC entity 916 and pass the PDCP PDU PTM transmission to SDAP entity 910. Similarly, the UE may transmit feedback via the PTM originating from PDCP entity 912 via dedicated RLC UM entity 914*c* and MAC entity 916. Thus, as shown, the L2 architecture of the UE may include an M-RLC UM entity for downlink PTM, and dedicated RLC UM entities for uplink and downlink (e.g., peer RLC UM entities) in order to support PTM feedback with PTP retransmission.

Alternatively, as shown in FIG. 9C, in some embodiments, an L2 architecture of a UE, such as UE 106, may include the SDAP entity 910, the PDCP entity 912, an RLC AM entity 915*a* supporting both uplink and downlink PTM, an RLC AM entity 915*b* support uplink and downlink PTP, and the MAC entity 916. In such an architecture, the UE may receive the PDCP PDU PTM transmission 902 at PDCP entity 912 via RLC AM entity 915*a* and MAC entity 916 and pass the PDCP PDU PTM transmission to SDAP entity 910. Similarly, the UE may transmit feedback via the PTM originating from PDCP entity 912 via RLC AM entity 915*a* and MAC entity 916. Thus, as shown, the L2 architecture of the UE may include an RLC AM entity supporting both uplink and downlink (e.g., peer RLC AM entities) PTM as well as an RLC AM supporting uplink and downlink PTP in order to support PTM feedback with PTP retransmission.

Figure 10A:
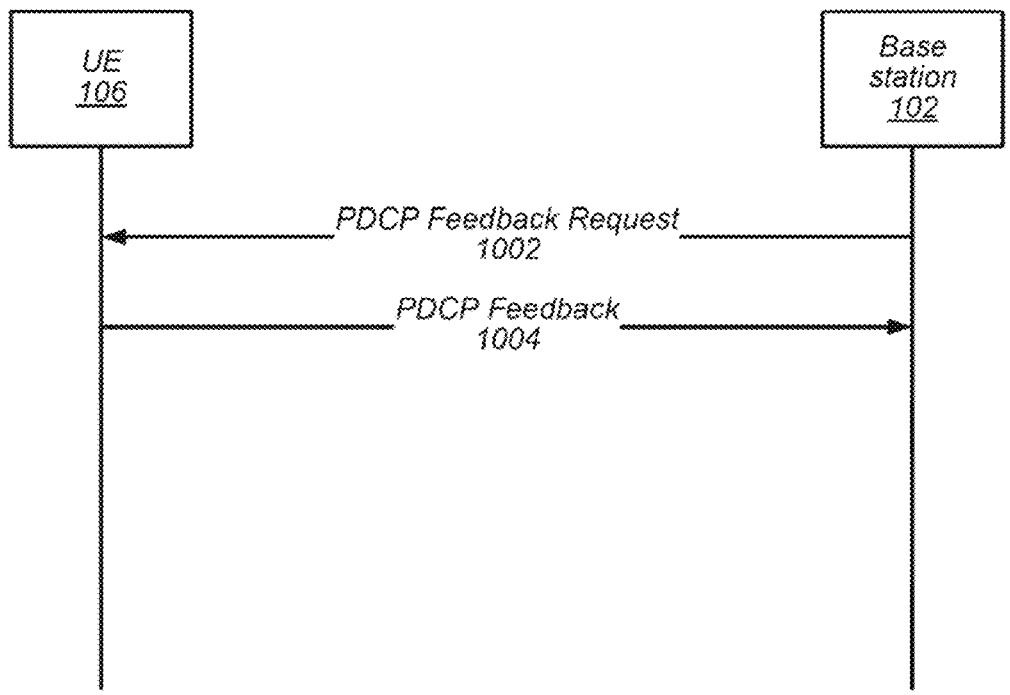
FIG. 10A illustrates an example of signaling for triggering PDCP feedback for a PTM transmission when a missing PDU is detected, according to some embodiments.
Figure 10B:
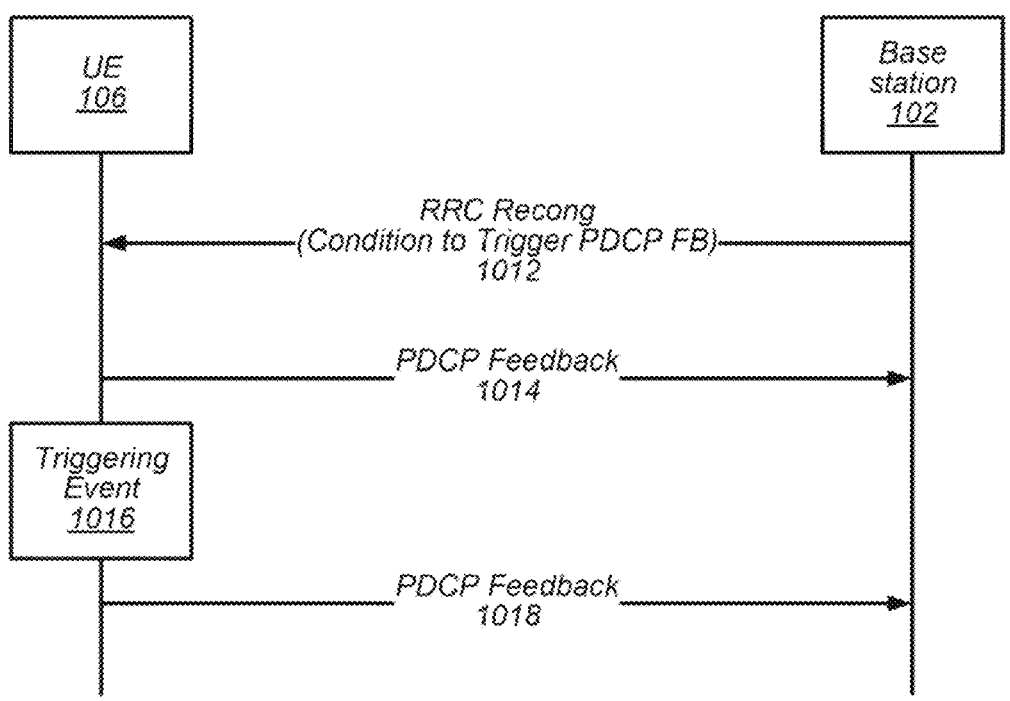
FIG. 10B illustrates an example of signaling for triggering PDCP feedback for a PTM transmission where triggering conditions are configured via RRC signaling, according to some embodiments.
Figure 10C:
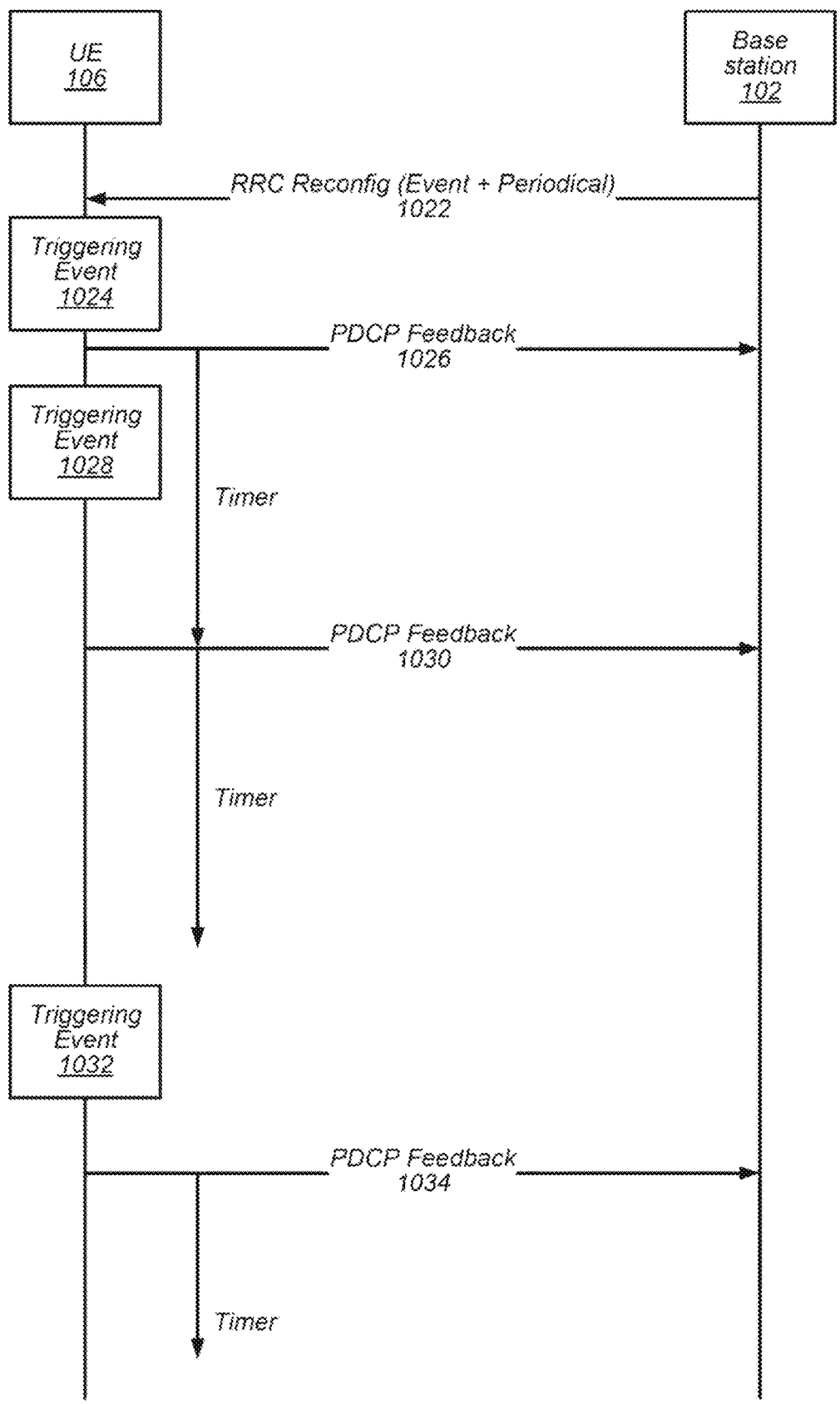
FIG. 10C illustrates an example of signaling for triggering PDCP feedback for a PTM transmission where triggering conditions and feedback periodicity are configured via RRC signaling according to some embodiments.

FIGS. 10A-10C illustrate examples of signaling for triggering PDCP feedback for a PTM transmission, according to some embodiments. The signaling shown in FIGS. 10A-10C may be used in conjunction with any of the systems, methods, or devices shown in the Figures, among other devices. In particular, FIG. 10A illustrates an example of signaling for triggering PDCP feedback for a PTM transmission based on a network request, according to some embodiments, FIG. 10B illustrates an example of signaling, for triggering PDCP feedback for a PTM transmission where triggering conditions are configured via RRC signaling, according to some embodiments, and FIG. 10C illustrates an example of signaling for triggering PDCP feedback for a PTM transmission where triggering conditions and feedback periodicity are configured via RRC signaling, according to some embodiments. In various embodiments, some of the signaling shown may be performed concurrently, in a different order than shown, or may be omitted. Additional signaling may also be performed as desired. As shown, this signaling may flow as follows.

Turning to FIG. 10A, at 1002, a UE, such as UE 106, may receive, from a base station, such as base station 102, a request for PDCP feedback for an MRB. The request may include an indication of the MRB and/or may be associated with a particular PDCP PDU transmission via PTM. At 1004, the UE may transmit, to the base station, PDCP feedback for the indicated MRB and/or for the particular PDCP PDU transmission via PTM. The PDCP feedback may include an indication of received and/or missed PDUs from the particular PDCP PDU transmission.

Turning to FIG. 10B, at 1012, a UE, such as UE 106, may receive, from a base station, such as base station 102, a radio resource control (RRC) re-configuration message. The RRC re-configuration message may include one or more conditions for triggering PDCP feedback for an MRB. Additionally, the RRC re-configuration message may include an indication of the MRB. The one or more conditions may include any, any combination of, and/or all of UE detection of missing PDCP PDUs, UE detection of missing PDCP PDUs exceeding a threshold amount of missing PDCP PDUs, and/or the UE detecting that a PDCP reordering window is moving due to a reordering timer expiry. As shown at 1014, the UE may provide initial PDCP feedback to the base station for the indicated MRB and/or for the particular PDCP transmission via PTM, e.g., based on receiving the RRC re-configuration message. The PDCP feedback may include an indication of received and/or missed PDUs from the particular PDCP transmission. Additionally, at 1016, the UE may detect a PDCP feedback triggering event for the MRB. In response, at 1018 the UE may provide PDCP feedback to the base station for the indicated MRB and/or for the particular PDCP PDU transmission via PTM, e.g., based on detection of the triggering event at 1016. The PDCP feedback may include an indication of received and/or missed PDUs from the particular PDCP PDU transmission.

Turning to FIG. 10C, at 1022, a UE, such as UE 106, may receive, from a base station, such as base station 102, a radio resource control (RRC) re-configuration message, The RRC re-configuration message may include one or more conditions for triggering PDCP feedback for an MRB as well an indication of a periodicity for periodic PDCP feedback. Additionally, the RRC re-configuration message may include an indication of the MRB. The one or more conditions may include any, any combination of, and/or all of UE detection of missing PDCP PDUs, UE detection of missing PDCP PDUs exceeding a threshold amount of missing PDCP PDUs and/or the UE detecting that a PDCP reordering window is moving due to a reordering timer expiry. As shown, at 1024, the UE may detect a PDCP feedback triggering event for the MRB. In response, at 1026 the UE may provide PDCP feedback to the base station for the indicated MRB and/or for the particular PDCP PDU transmission via PTM, e.g., based on detection of the triggering event at 1024. Additionally, the UE may initiate a timer based on the periodicity for periodic PDCP feedback included and/or indicated by the RRC re-configuration message. The PDCP feedback may include an indication of received and/or missed PDUs from the particular PDCP PDU transmission. Further, at 1028, the UE may detect another PDCP feedback triggering event for the MRB. However, since the triggering event occurs during the timer, the UE may cache the trigger event. Then, at 1030, the UE may provide PDCP feedback, including PDCP feedback associated with the triggering event at 1028, based on expiration of the timer. The PDCP feedback may include an indication of received and/or missed PDUs from the particular PDCP PDU transmission. Additionally, the UE may restart the timer. Further, as shown, if there are no trigger events at the expiration of the timer started at 1030, the UE may not provide PDCP feedback upon expiration of that timer. Further, upon detection of trigger event 1032, the UE may provide PDCP feedback to the base station for the indicated MRS and/or for the particular PDCP PDU transmission via PTM, e.g., based on detection of the triggering event at 1032. Additionally, the UE may then restart the timer upon providing PDCP feedback 1034.

Thus, as illustrated by FIG. 10C, in some embodiments, PDCP feedback reporting may be event driven until a triggering event is detected. Then, the UE may cache additional triggering events until expiry of a timer. Further, if PDCP feedback is reported at the expiration of the timer (e.g., at least one triggering event occurred prior to expiration of the tuner), the UE may restart the timer. However, if PDCP feedback is not reported at the expiration of the timer (e.g., there were no triggering events prior to expiration of the timer), the UE may revert back to event driven PDCP feedback.

In some embodiments, a UE, such as UE 106, may provide a base station, such as base station 102, layer 3 (L3) based radio quality feedback for PTM transmissions. For example, for L3 radio resource management (RRM) measurement, the base station (e.g., network) may configure PTM specific measurement configurations and/or objects. In addition, for layer 1 (L1) channel state information (CSI) reporting, the base station may configure measurements on a PTM specific resource. In some embodiments, for L3 RRM measurements, the UE may have differing behaviors and/or configurations depending on whether a network connection of the UE is in a connected state (e.g., CONNECTED mode) or an idle/inactive state (e.g., IDLE/INACTIVE mode).

For example, when the UE is in a connected state, the base station (e.g., network) may configure the UE via a measurement object and/or a measurement configuration and/or a measurement report for MBMS purpose, e.g., via RRC signaling. In response to the configuration, the UE may include, in a RRC message, measurement results on a resource configured for the MBMS purpose. The RRC message may include an RRC measurement report as well as secondary cell group (SCG) failure information and/or master cell group (MCG) failure information. The network may then base selection of a serving cell and bandwidth part (BWP) for the UE based on the MBMS measurement result together with serving cell measurement results.

As another example, when the UE is in an idle/inactive state, the base station (e.g., network) may configure the UE via a measurement configuration for MBMS purpose, e.g., via an RRC release message and/or via a system information message. In some embodiments, if and/or when a UE receives an MBMS service while in an idle/inactive state and/or if/when a UE is interested in the MBMS service in serving cell, the UE may perform RRM measurements according to the MBMS specific measurement configuration. Then, when the UE enters a connected state, the UE may report available MBMS specific measurement result to the network via the idle/inactive state measurement report procedure. The network may then base selection of a serving cell and bandwidth part (BWP) for the UE based on the MBMS measurement result together with serving cell measurement results.

In some embodiments, PTM link failure detection may be based on occurrence of one or more evens. For example, PTM link failure detection may be based on RLC failure, e.g., when a number of transmissions (e.g., retransmissions) reaches and/or exceeds a configured threshold, at least in the case of PTM transmission via RLC AM entity. As another example, PTM link failure detection may be based on radio link failure (RLF) detection, e.g., if a radio link monitoring mechanism on the PTM link indicates measurement results falling below a threshold. In some embodiments, a UE may report failure information and/or a failure indication via a PTP link. For example, if the UE is configured with both PTP and PTM links for MBMS service reception, the UE may, upon detection of PTM link failure, autonomously switch to the PTP link wait for MBMS service reception. Note that if and/or when the UE is in a DRX-off state for PTP transmission, the UE may directly enter a DRX-on state and monitor the UE dedicated PDCCH. Additionally, upon receiving the report of the failure from the UE, the network may attempt to reconfigure the PTM link and/or provide the MBMS service via the PTP link.

Figure 11A:
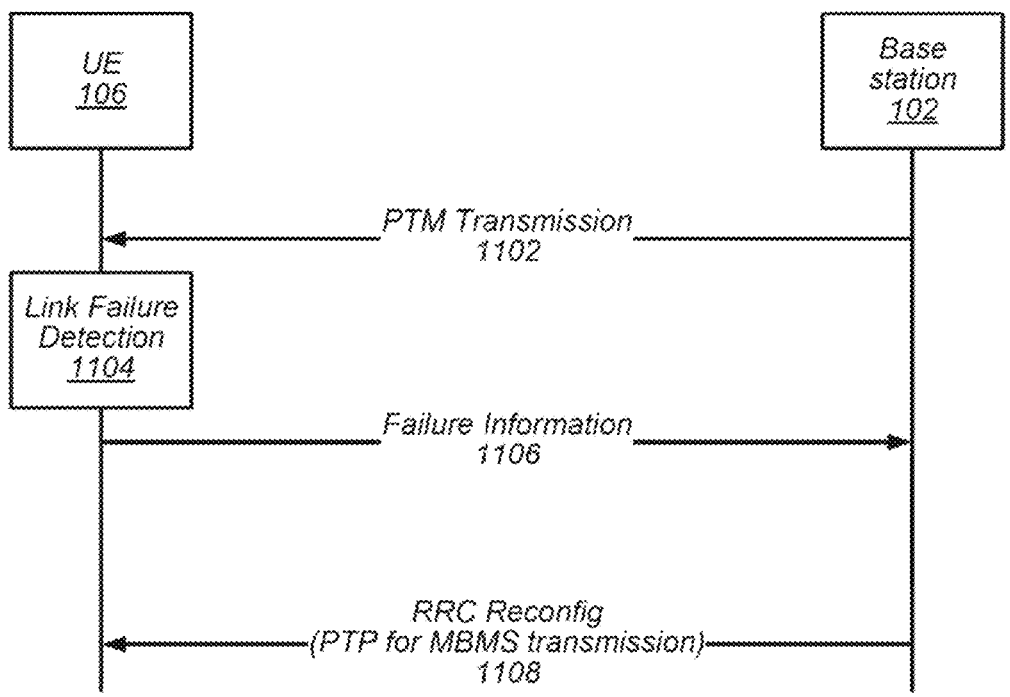
FIG. 11A illustrates an example of signaling for PTM link failure with an RRC reconfiguration, according to some embodiments.
Figure 11B:
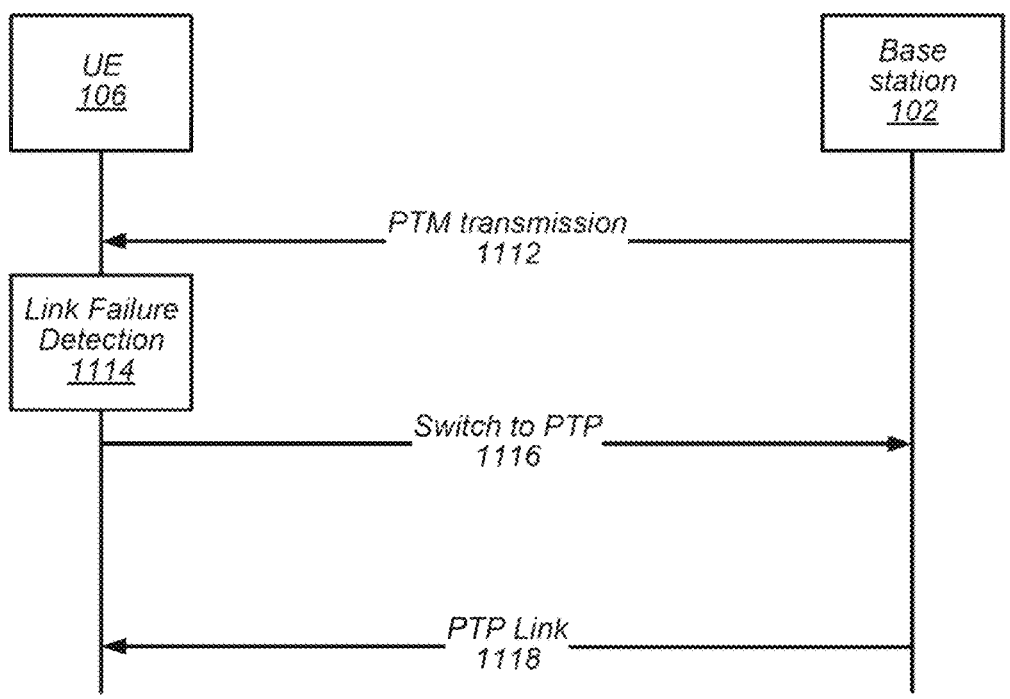
FIG. 11B illustrates an example of signaling for PTM link failure with a switch to a PTP link, according to some embodiments.

FIGS. 11A-11B illustrate examples of signaling for PTM link failure, according to some embodiments. The signaling shown in FIGS. 11A-11B may be used in conjunction with any of the systems, methods, or devices shown in the Figures, among other devices. In particular, FIG. 11A illustrates an example of signaling for PTM link failure with an RRC reconfiguration, according to some embodiments, and FIG. 11B illustrates an example of signaling for PTM link failure with a switch to a PTP link, according to some embodiments. In various embodiments, some of the signaling shown may be performed concurrently, in a different order than shown, or may be omitted. Additional signaling may also be performed as desired. As shown, this signaling may flow as follows.

Turning to FIG. 11A, at 1102, a UE, such as UE 106, may receive from a base station, such as base station 102, one or more PTM transmissions via a PTM link. At 1104, the UE may detect a link failure, e.g., as described above. Then, in response to detecting the link failure, the UE may send failure information (and/or a failure indication) to the base station. The UE may receive, at 1108, an RRC reconfiguration message that moves the MBMS transmission from the PTM link to a PTP link.

Turning to FIG. 11B, at 1112, a UE, such as UE 106, may receive from a base station, such as base station 102, one or more PTM transmissions via a PTM link. At 1114, the UE may detect a link failure, e.g., as described above. Then, in response to detecting the link failure, the UE may switch the PTM link to a PTP link, e.g., assuming the UE has been configured with both PTP and PTM for The MBMS service reception. Then, at 1116, the UE may transmit an indication of the switch to the base station. At 1118, the UE may receive MBMS transmission from the base station via the PTP link.

In some embodiments, a UE in an idle/inactive state may provide MBMS feedback for a PTM via one or more mechanisms. For example, when entering a connected state (e.g., CONNECTED mode), the UE may report a log of the MBMS reception situation and radio quality while the UE was in the idle/inactive state. As another example, the UE may remain in the idle/inactive state and may provide MBMS feedback for the PTM via a random-access channel (RACH) procedure. As a further example, the UE may remain in the idle/inactive state and may provide MBMS feedback for the PTM via a preconfigured PUSCH resource. In some embodiments, for idle/inactive state MBMS feedback, the network may provide MBMS feedback resources when the UE enters the idle/inactive state. The MBMS feedback resources may be dedicated for each MBMS service and/or may be shared for multiple UEs. The MBMS feedback may include simple good/fine/bad indication together with the MBMS service ID (MRB ID or TMGI). In some embodiments, for idle/inactive state MBMS feedback, the network may control reporting frequency via trigger conditions and/or timers. The trigger conditions may be based on radio quality and/or subsequent reception failure numbers.

Figure 12A:
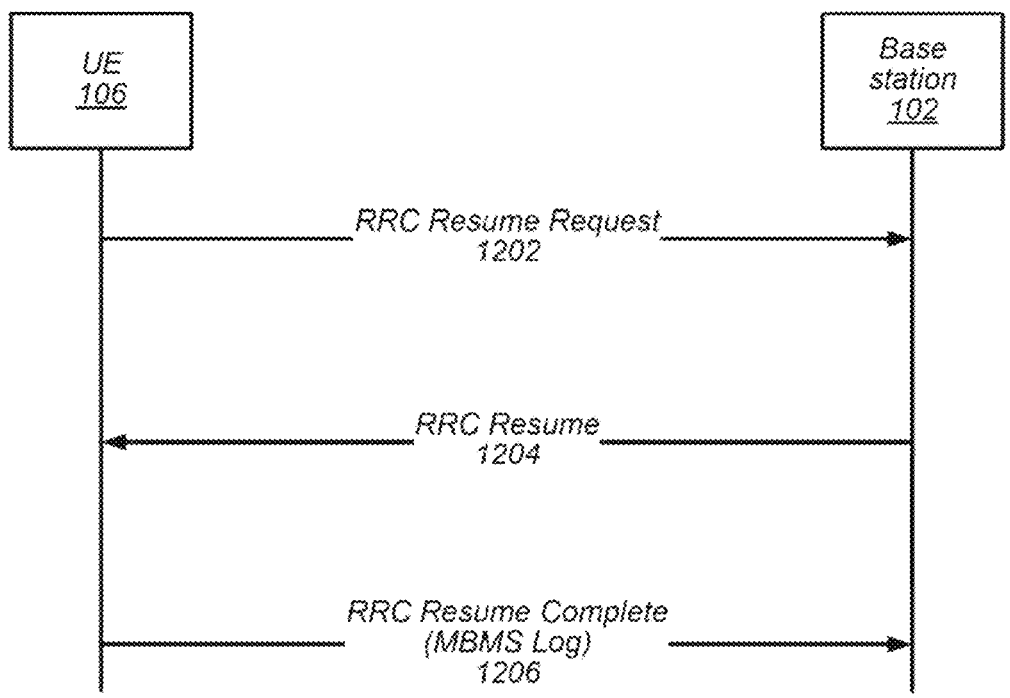
FIG. 12A illustrates an example of signaling for PDCP feedback for a PTM transmission for a UE in an idle and/or inactive state via RRC signaling, accordion to some embodiments.
Figure 12B:
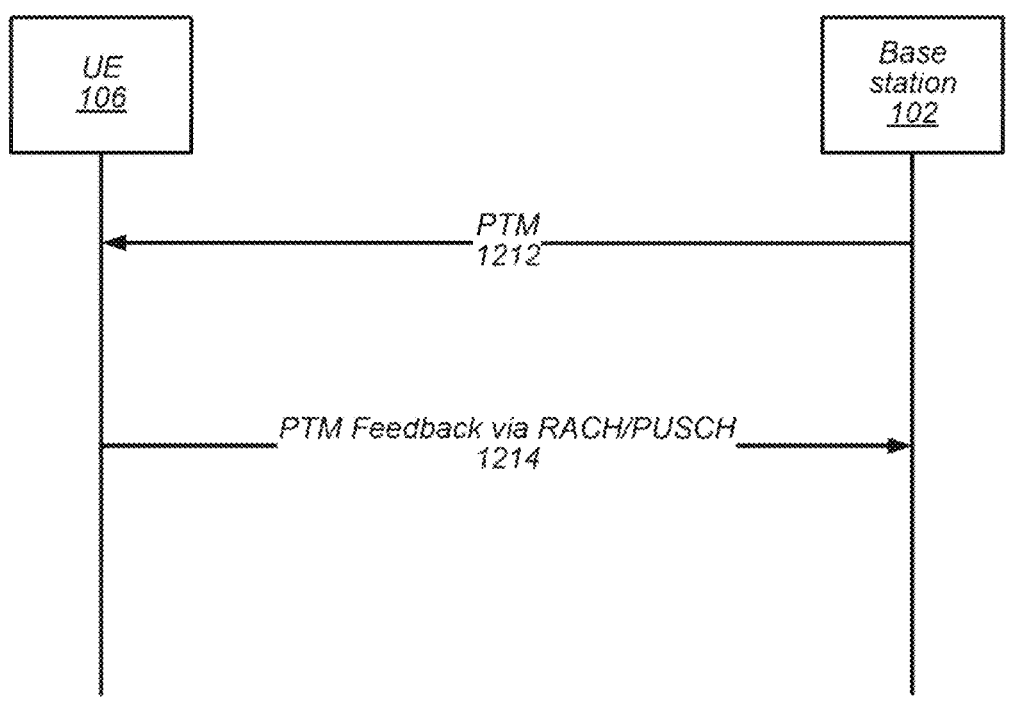
FIG. 12B illustrates an example of signaling for PDCP feedback for a PTM transmission for a UE in an idle and/or inactive state via RACH/PUSCH, according to some embodiments.

FIGS. 12A-12B illustrate examples of signaling for PDCP feedback for a PTM transmission for a UE in an idle and/or inactive state, according to some embodiments. The signaling shown in FIGS. 12A-12B may be used in conjunction with any of the systems, methods, or devices shown in the Figures, among other devices. In particular, FIG. 12A illustrates an example of signaling for PDCP feedback for a PTM transmission for UE in an idle and/or inactive slate via RRC signaling, according to some embodiments, and FIG. 12B illustrates an example of signaling for PDCP feedback for a PIM transmission for a UE in an idle and/or inactive state via RACH/PUSCH, according to some embodiments. In various embodiments, some of the signaling shown may be performed concurrently, in a different order than shown, or may be omitted. Additional signaling may also be performed as desired. As shown, this signaling may flow as follows.

Turning to FIG. 12A, at 1202, a UE, such as UE 106, may transition from an idle/inactive mode to a connected mode by transmitting, to a base station, such as bast station 102, an RRC resume request. The UE may then receive, at 1204 an RRC resume response. The UE may record (e.g., measure) MBMS reception situation (e.g., RSRP, BLER, and so forth) Then, at 1206, the UE may provide MBMS feedback via an MBMS log (e.g., an indication of the MBMS reception situation) included in an RRC resume complete message.

Turning to FIG. 12B, at 1212, a UE, such as UE 106, while in an idle/inactive mode, may receive an MBMS transmission and/or monitor a PTM link. Then, at 1214, the UE may provide MBMS feedback (e.g., PTM feedback) via a RACH procedure and/or via pre-configured PUSCH resources, e.g., as described above.

Figure 13:
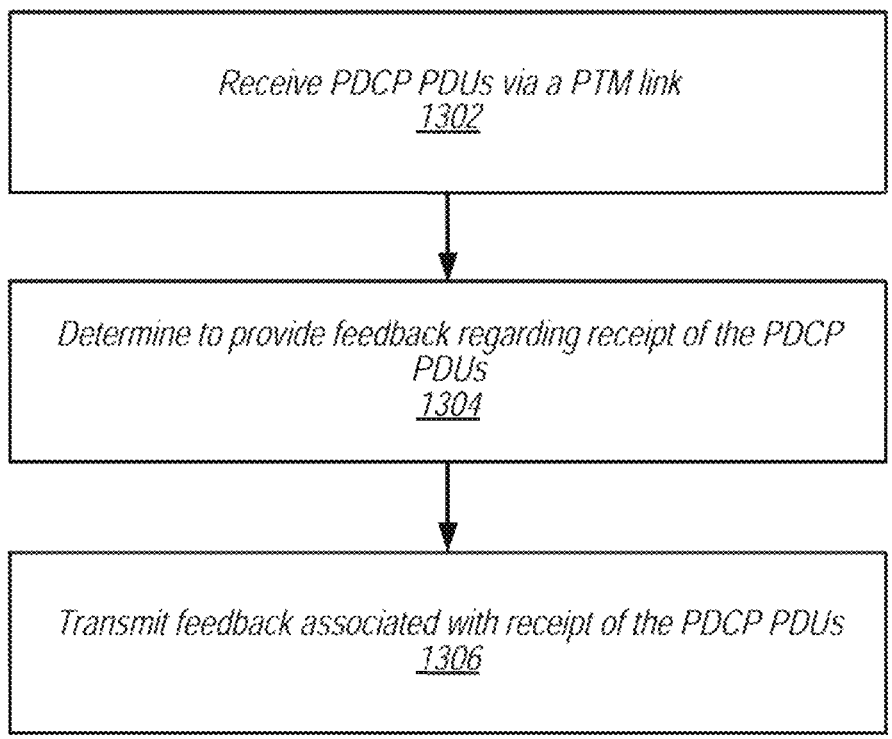
FIGS. 13 and 14 illustrate block diagrams of examples of methods for a UE to provide feedback to a network for a PTM link, according to some embodiments.
Figure 14:
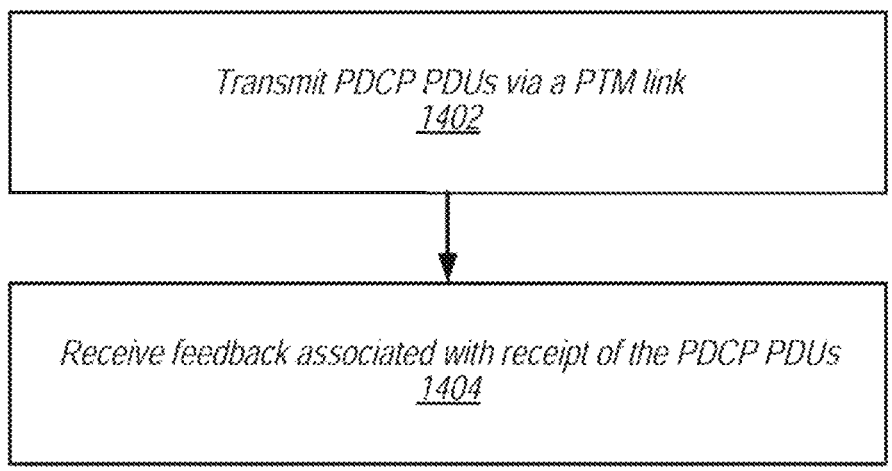

FIGS. 13 and 14 illustrate block diagrams of examples of methods for a UE to provide feedback to a network for a PTM link, according to some embodiments. The methods shown in FIGS. 13 and 14 may be used in conjunction with one another as well as with any of the systems, methods, signaling or devices shown in the Figures, among other devices. In particular, FIG. 13 illustrates a block diagram of example of method for a UE to provide feedback to a network for a PTM link from the UE's perspective and FIG. 14 illustrates a block diagram of example of method for a UE to provide feedback to a network for a PTM link from the network's perspective. In various embodiments, some of the method elements shown may be performed concurrently, in a different order than shown, or may be omitted. Additional method elements may also be performed as desired. As shown, these methods may operate as follows.

Turning to FIG. 13, at 1302, a UE, such as UE 106, may receive PDCP PDUs (e.g., one or more PDCP PDUs) via a PTM link from a network, e.g., from a network entity such as base station 102.

At 1304, the UE may determine to provide feedback regarding receipt of the PDCP PDUs. The determination may be based, at least in part, on an occurrence of at least one condition (e.g., of at least one triggering event and/or at least one network configured triggering event). The at least one condition may include any, any combination of, and/or all of the UE receiving, from the network, a request for feedback, the UE determining that at least one PDCP PDU of the one or more PDCP PDUs is missing, the UE determining that a number of missing PDCP PDUs of the one or more PDCP PDUs exceeds a threshold, and/or the UE determining that a PDCP reordering window is changing based an expiration of a PDCP reordering timer. In some embodiments, the at least one condition may occur during a network configured time period since prior feedback associated with prior receipt of PDCP PDUs via the PTM was transmitted. In such instances, transmission of the feedback associate with receipt of the one or more PDCP PDUs may occur at the expiration of the time period. In some embodiments, the threshold may be based on a number of PDCP PDUs transmitted. In some embodiments, the threshold may be configured by the network.

At 1306, the UE may transmit feedback associated with receipt of the PDCP PDUs to the network. The feedback may include an indication of missing PDCP PDUs. In some embodiments, the feedback may include art indication of a sequence number associated with at least one missing PDCP PDU.

In some embodiments, the UE may receive, from the network, a PDCP PDU retransmission. The PDCP PDU retransmission may include at least one PDCP PDU indicated as missing in the feedback.

In some embodiments, the PDCP PDU retransmission may be received via the PTM link. In such embodiments, the UE may include a protocol stack and the protocol stack may include a PDCP layer, a medium access control (MAC) layer, and a radio link control (RLC) layer. The RLC layer may be configured in unacknowledged mode (UM) and may include a first RLC-UM entity associated with the PTM link and a second RLC-UM entity associated with a point-to-point (PTP) link. Further, the feedback may be transmitted via the PTP link.

In some embodiments, the PDCP PDU retransmission may be received via the PTM link. In such embodiments, the UE may include a protocol stack and the protocol stack may include a PDCP layer, a MAC layer, and an RLC layer. The RLC layer may be configured in acknowledged mode (AM) and may include an RLC-AM entity associated with the PTM link and with a point-to-point (PTP) link. Further, the feedback may be transmitted via the PTP link.

In some embodiments, the PDCP PDU retransmission may be received via a PTP link. In such embodiments, the UE may include a protocol stack and the protocol stack may include a PDCP layer, a MAC layer, and an RLC layer. The RLC layer may be configured in unacknowledged mode (UM) and may include a multi-point RLC-UM entity associated with the PTM link, a first dedicated RLC-UM associated with an uplink point-to-point (PTP) link, and a second dedicated RLC-UM associated with a downlink PTP link. Further, the feedback may be transmitted via the PTP link.

In some embodiments, the PDCP PDU retransmission may be received via a PTP link. In such embodiments, the UE may include a protocol stack and the protocol stack may include a PDCP layer, a MAC layer, and an RLC layer. The RLC layer may be configured in acknowledged mode (AM) and may include a first RLC-AM entity associated with the PTM link and an uplink PTP link and a second RLC-AM entity associated with a downlink PTP link. Further, the feedback may be transmitted via the PTP link.

In some embodiments, the UE may receive, from the network, a feedback configuration message. The feedback configuration message may include an indication of the at least one condition. In some embodiments, the feedback configuration message may be received via RRC signaling. In such embodiments, the feedback configuration message may be an RRC reconfiguration message. Further, the indication of the at least one condition may include a network configured periodic timer and/or a threshold for missing PDCP PDUs.

In some embodiments, the UE may receive, from the network, a PTM link measurement configuration and object and may perform, based on the PTM link measurement configuration and object, layer 3 (L3) radio resource management (RRM) measurements. In some embodiments, when the UE is in a connected state with the network, the UE may include L3 RRM measurement results in an RRC message to the network. In some embodiments, when the UE is in an idle state and/or inactive state with the network, the UE may report, to the network, L3 RRM measurement results when the UE enters a connected state with the network.

In some embodiments, the UE may detect a PTM link failure and may transmit, to the network, an indication of the PTM link failure. Transmitting the indication of the PTM link failure may include the UE transmitting a report of the PTM link failure via a PTP link. In some embodiments, the UE may receive, from the network, an RRC reconfiguration message indicating a PTP link to continue communications.

In some embodiments, the UE may detect a PTM link failure and may transmit, to the network, an indication of the PTM link failure. Transmitting the indication of the PTM link failure may include the UE transmitting an indication of a switch from the PTM link to a PTP link. In some embodiments, the UE may receive, from the network, PDCP PDUs via the PTP link.

In some embodiments, the UE may receive PDCP PDUs while in an inactive state and/or idle state with the network. In some embodiments, transmitting the feedback associated with receipt of the PDCP PDUs may be performed upon the UE entering a connected state with the network. In some embodiments, the UE may transmit the feedback associated with receipt of the PDCP PDUs via a random-access channel (RACH) procedure or via a preconfigured physical uplink shared channel (PUSCH) resource, e.g., prior to the UE entering a connected state with the network.

Turning to FIG. 14, at 1402, a network entity, such as base station 102, may transmit, to a UE, such as UE 106, PDCP PDUs (e.g., one or more PDCP PDUs) via a PTM link.

At 1404, the network entity may receive, from the UE, feedback associated with receipt of the PDCP PDUs. The feedback may include an indication of missing PDCP PDUs. In some embodiments, the feedback may include an indication of a sequence number associated with at least one missing PDCP PDU. In some embodiments, the feedback associated with receipt of the PDCP PDUs may be responsive to the UE detecting an occurrence of at least one condition (e.g., of at least one triggering event and/or at least one network configured triggering event). The at least one condition may include any, any combination of, and/or all of the network entity transmitting, to the UE, a request for feedback, the UE determining that at least one PDCP PDU of the one or more PDCP PDUs is missing, the determining that a number of missing PDCP PDUs of the one or more PDCP PDUs exceeds a threshold, and/or the UE determining that a PDCP reordering window is changing based on expiration of a PDCP reordering timer. In some embodiments, the at least one condition may occur during a network configured time period since prior feedback associated with prior receipt of PDCP PDUs via the PTM was transmitted. In such instances, UE transmission of the feedback associate with receipt of the one or more PDCP PDUs may occur at the expiration of the time period. In some embodiments, the threshold may be based on a number of PDCP PDUs transmitted. In some embodiments, the threshold may be configured by the network.

In some embodiments, the network entity may transmit, to the UE, a PDCP PDU retransmission. The PDCP PDU retransmission may include at least one PDCP PDU indicated as missing in the feedback.

In some embodiments, the PDCP PDU retransmission may be transmitted via the PTM link. In such embodiments, the UE may include a protocol stack and the protocol stack may include a PDCP layer, a medium access control (MAC) layer, and a radio link control (RLC) layer. The RLC layer may be configured in unacknowledged mode (UM) and may include a first RLC-UM entity associated with the PTM link and a second RLC-UM entity associated with a point-to-point (PTP) link. Further, the feedback may be received via the PTP link.

In some embodiments, the PDCP PDU retransmission may be transmitted via the PTM link. In such embodiments, the UE may include a protocol stack and the protocol stack may include a PDCP layer, a MAC layer, and an RLC layer. The RLC layer may be configured in acknowledged mode (AM) and may include an RLC-AM entity associated with the PTM link and with a point-to-point (PTP) link. Further, the feedback may be received via the PTP link.

In some embodiments, the PDCP PDU retransmission may be transmitted via a PTP link. In such embodiments, the UE may include a protocol stack and the protocol stack may include a PDCP layer, a MAC layer, and an RLC layer. The RLC layer may be configured in unacknowledged mode (UM) and may include a multi-point RLC-UM entity associated with the PTM link, a first dedicated RLC-UM associated with an uplink point-to-point (PTP) link, and a second dedicated RLC-UM associated with a downlink PTP link. Further, the feedback may be received via the PTP link.

In some embodiments, the PDCP PDU retransmission may be transmitted via a PTP link. In such embodiments, the UE may include a protocol stack and the protocol stack may include a PDCP layer, a MAC layer, and an RLC layer. The RLC layer may be configured in acknowledged mode (AM) and may include a first RLC-AM entity associated with the PTM link and an uplink PTP link and a second RLC-AM entity associated with a downlink PTP link. Further, the feedback may be received via the PTP link.

In some embodiments, the network entity may transmit, to the UE, a feedback configuration message. The feedback configuration message may include an indication of the at least one condition. In some embodiments, the feedback configuration message may be transmitted via RRC signaling. In such embodiments, the feedback configuration message may be an RRC reconfiguration message. Further, the indication of the at least one condition may include a network configured periodic timer and/or a threshold for missing PDCP PDUs.

In some embodiments, the network entity may transmit, to the UE, PTM link measurement configuration and object. The UE may perform, based on the PTM link measurement configuration and object, layer 3 (L3) radio resource management (RRM) measurements. In some embodiments, when the UE is in a connected state with the network, the network may receive, from the UE, L3 RRM measurement results via an RRC message. In some embodiments, when the UE is in an idle state and/or inactive state with the network, the network entity may receive, from the UE, a report of L3 RRM measurement results when the UE enters a connected state with the network.

In some embodiments, the network entity may receive, from the UE, an indication of a PTM link failure, e.g., based on the UE detecting the PTM link failure. Receiving the indication of the PTM link failure may include the network entity receiving, from the UE, a report of the PTM link failure via a PTP link. In some embodiments, the network entity may transmit, to the UE, an RRC reconfiguration message indicating a PTP link to continue communications.

In some embodiments, the network entity may receive, from the UE, an indication of a PTM link failure, e.g., based on the UE detecting the PTM link failure. Receiving the indication of the PTM link failure may include the network entity receiving, from the UE, an indication of a switch from the PTM link to a PTP link. In some embodiments, the network entity may transmit, to the UE, PDCP PDUs via the PTP link.

In some embodiments, the network entity may transmit the PDCP PDUs to the UE while the UE is in an inactive state and/or idle state with the network. In some embodiments, the feedback associated with receipt of the PDCP PDUs may be received upon the UE entering a connected state with the network. In some embodiments, the network entity may receive, from the UE, the feedback associated with receipt of the PDCP PDUs via a random-access channel (RACH) procedure or via a preconfigured physical uplink shared channel (PUSCH) resource, e.g., prior to the UE entering a connected state with the network.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor, comprising:
a memory; and
processing circuitry in communication with the memory and configured to:
receive, from a network via a point-to-multipoint (PTM) link, one or more Packet Data Convergence Protocol (PDCP) protocol data units (PDUs) as part of a multimedia broadcast multicast service (MBMS); and
receive an MBMS specific measurement information via a radio resource control (RRC) release message for use when receiving the MBMS service while in an inactive state.

2. The processor of claim 1,
wherein the processing circuitry is further configured to:
receive, from the network, a feedback configuration message, wherein the feedback configuration message includes an indication of a network configured triggering event.

3. The processor of claim 2,
wherein the feedback configuration message is received via radio resource control (RRC) signaling, and wherein the feedback configuration message is an RRC reconfiguration message.

4. The processor of claim 2,
wherein the indication of the network configured triggering event includes at least one of:
a network configured periodic timer; or
a threshold for missing PDCP PDUs.

5. The processor of claim 1,
wherein the processing circuitry is further configured to:
receive, from the network, a PTM link measurement configuration and object; and
generate instructions to perform, based on the PTM link measurement configuration and object, layer 3 (L3) radio resource management (RRM) measurements.

6. The processor of claim 5,
wherein, when in a connected state with the network, the processing circuitry is configured to include L3 RRM measurement results in a radio resource control (RRC) message to the network; and
wherein, when in an idle state or inactive state with the network, the processing circuitry is configured to report, to the network, L3 RRM measurement results upon entering a connected state with the network.

7. A non-transitory computer readable memory medium storing program instructions executable by processing circuitry to:
receive, from a network via a point-to-multipoint (PTM) link, one or more Packet Data Convergence Protocol (PDCP) protocol data units (PDUs) as part of a multimedia broadcast multicast service (MBMS); and
receive an MBMS specific measurement information via a radio resource control (RRC) release message for use when receiving the MBMS service while in an inactive state.

8. The non-transitory computer readable memory medium of claim 7,
wherein the program instructions are further executable to:
detect a PTM link failure; and
transmit, to the network, an indication of the PTM link failure, wherein, to transmit the indication of the PTM link failure, the program instructions are further executable to cause the UE to:
transmit a report of the PTM link failure via a point-to-point (PTP) link; or
transmit an indication of a switch from the PTM link to a point-to-point (PTP) link.

9. The non-transitory computer readable memory medium of claim 8,
wherein, when the report of the PTM link failure is transmitted via a PTP link, the program instructions are further executable to, from the network, a radio resource control (RRC) reconfiguration message indicating a PTP link to continue communications; and
wherein, when the indication of a switch from the PTM link to a PTP link is transmitted, the program instructions are further executable to receive, from the network, PDCP PDUs via the PTP link.

10. The non-transitory computer readable memory medium of claim 7,
wherein, when the one or more PDCP PDUs are received while in an inactive state or idle state with the network, the program instructions are further executable to perform transmitting feedback associated with receipt of the one or more PDCP PDUs upon entering a connected state with the network, via a random-access channel (RACH) procedure prior to entering the connected state, or via a preconfigured physical uplink shared channel (PUSCH) resource prior to entering the connected state.

11. A method, comprising:
receiving, from a network via a point-to-multipoint (PTM) link, one or more Packet Data Convergence Protocol (PDCP) protocol data units (PDUs) as part of a multimedia broadcast multicast service (MBMS); and
receiving an MBMS specific measurement information via a radio resource control (RRC) release message for use when receiving the MBMS service while in an inactive state.

12. The method of claim 11, further comprising:
determining, based on an occurrence of at least one condition, to provide feedback associated with receipt of the one or more PDCP PDUs via the PTM link; and
transmitting, to the network, feedback associated with receipt of the one or more PDCP PDUs as part of the MBMS.

13. The method of claim 12,
wherein the at least one condition occurs during a network configured time period since prior feedback associated with prior receipt of PDCP PDUs via the PTM was transmitted, and wherein transmitting, to the network, feedback associate with receipt of the one or more PDCP PDUs occurs at the expiration of the time period.

14. The method of claim 12,
wherein the feedback includes at least one of an indication of missing PDCP PDUs or an indication of a sequence number associated with at least one missing PDCP PDU.

15. The method of claim 11, further comprising:
receiving, from the network, a PDCP PDU retransmission, wherein the PDCP PDU retransmission includes at least one PDCP PDU indicated as missing in feedback provided to the network, and wherein the PDCP PDU retransmission is received via the PTM link or PTP link.

16. The method of claim 15,
wherein a protocol stack includes a PDCP layer, a medium access control layer, and a radio link control (RLC) layer, wherein the RLC layer is configured in unacknowledged mode (UM), wherein the RLC layer includes a first RLC-UM entity associated with the PTM link and a second RLC-UM entity associated with a point-to-point (PTP) link, and wherein the feedback is transmitted via the PTP link.

17. The method of claim 15,
wherein a protocol stack includes a PDCP layer, a medium access control layer, and a radio link control (RLC) layer, wherein the RLC layer is configured in acknowledged mode (AM), wherein the RLC layer includes an RLC-AM entity associated with the PTM link and with a point-to-point (PTP) link, and wherein the feedback is transmitted via the PTP link.

18. The method of claim 11,
receiving, from the network, a PDCP PDU retransmission, wherein the PDCP PDU retransmission includes at least one PDCP PDU indicated as missing in feedback provided to the network, and wherein the PDCP PDU retransmission is received via a point-to-point (PTP) link.

19. The method of claim 18,
wherein a protocol stack includes a PDCP layer, a medium access control layer, and a radio link control (RLC) layer, wherein the RLC layer is configured in unacknowledged mode (UM), wherein the RLC layer includes a multi-point RLC-UM entity associated with the PTM link, a first dedicated RLC-UM associated with an uplink point-to-point (PTP) link, and a second dedicated RLC-UM associated with a downlink PTP link, and wherein the feedback is transmitted via the PTP link.

20. The method of claim 18,
wherein a protocol stack includes a PDCP layer, a medium access control layer, and a radio link control (RLC) layer, wherein the RLC layer is configured in acknowledged mode (AM), wherein the RLC layer includes a first RLC-AM entity associated with the PTM link and an uplink point-to-point (PTP) link and a second RLC-AM entity associated with a downlink PTP, and wherein the feedback is transmitted via the PTP link.

* * * * *